United States Patent
Kobayakawa et al.

[11] Patent Number: 6,064,338
[45] Date of Patent: May 16, 2000

[54] ARRAY ANTENNA SYSTEM OF WIRELESS BASE STATION

[75] Inventors: Shuji Kobayakawa; Yoshinori Tanaka; Masafumi Tsutsui; Hiroyuki Seki, all of Kawasaki, Japan

[73] Assignee: Fujitsu Limited, Kanagawa, Japan

[21] Appl. No.: 09/141,738

[22] Filed: Aug. 27, 1998

[30] Foreign Application Priority Data

Mar. 19, 1998 [JP] Japan .................................. 10-069954

[51] Int. Cl.⁷ .................................................... G01S 3/16
[52] U.S. Cl. .......................................... 342/378; 342/383
[58] Field of Search ................................... 342/145, 189, 342/367, 378, 380, 382, 383; 370/320, 335, 342

[56] References Cited

U.S. PATENT DOCUMENTS

| | | | |
|---|---|---|---|
| 4,309,769 | 1/1982 | Taylor | 375/1 |
| 5,369,663 | 11/1994 | Bond | 371/1 |
| 5,757,845 | 5/1998 | Fukawa et al. | 375/200 |
| 5,812,542 | 9/1998 | Bruckert et al. | 370/335 |
| 5,859,842 | 1/1999 | Scott | 370/342 |
| 5,893,033 | 4/1999 | Keskitalo et al. | 455/437 |

*Primary Examiner*—Thomas H. Tarcza
*Assistant Examiner*—Dao L. Phan
*Attorney, Agent, or Firm*—Helfgott & Karas, PC

[57] ABSTRACT

An array antenna system of a wireless base station in CDMA mobile communications combines signals, which have been received by a plurality of antenna elements of an array antenna, upon subjecting the signals to amplitude and phase-rotation control, and despreads the combined signal. A searcher has matched filters which apply correlation operations to output signals from respective antenna elements to thereby calculate correlation signals that are correlated with a signal transmitted from a mobile station of interest. An adaptive weight calculating unit calculates adaptive weights for obtaining in-phase correlation signals from the respective antenna outputs. A beam former multiplies, by the adaptive weights, output signals from the corresponding antenna elements and combines the resulting products to output a combined signal. The combined signal is found for each path of multipaths and is input to a Rake receiver, which proceeds to identify data.

11 Claims, 16 Drawing Sheets

× : INTERFERENCE WAVES

ARRAY ANTENNA SYSTEM OF WIRELESS BASE STATION

BACKGROUND OF THE INVENTION

This invention relates to a wireless base station array antenna system. More particularly, the invention relates to an array antenna system such as an adaptive array antenna system in which a wireless base station of a DS-CDMA mobile communications system is provided with an array antenna having a plurality of antenna elements for converting signals received by the antenna elements to digital signals and combining the received signals upon subjecting them to any amplitude weight as well as phase rotation by arithmetic operations, thereby forming a desired beam pattern.

Digital cellular wireless communication systems using DS-CDMA (Direct Sequence Code Division Multiple Access) technology have been developed as next-generation mobile communications systems for implementing wireless multimedia communication. In such CDMA communications, transmission information from a plurality of channels or users is multiplexed by spreading codes that differ from one another and is transmitted via a transmission path such as a wireless link.

In wireless communications, radio waves from a transmitter arrive at a receiver via several paths (multipaths) having different path lengths. The receiver combines the radio waves. However, the combining of the radio waves is not performed by coherent addition, as a result of which fading occurs. Various diversity schemes have been proposed to deal with such fading. One example is a Rake receiving scheme. Rake reception is a technique which involves identifying signals that have passed through multipaths and combining the signals (by maximum-ratio combining) upon weighting them for reliability, thereby improving the characteristic. A receiver employing such Rake reception in CDMA communication has been proposed as a Rake receiver. FIG. 16A is a block diagram showing the construction of the prior-art Rake receiver, and FIG. 16B is a diagram useful in describing the delay profile thereof.

Shown in FIG. 16A are a searcher 1, fingers $2_1$–$2_3$ each of which is provided for a path of multipaths, an antenna 3, a Rake combiner 4 for combining the outputs of the fingers, and a discriminator 5 for discriminating the "1"s and "0"s of received data based upon the output of the combiner 4.

As shown in FIG. 16B, the reception level of the signal sent from a transmitter varies in the receiver in dependence upon the multipaths, and the times of arrival at the receiver differ as well. The searcher 1 (1) measures the profile of the antenna reception level (the temporal transition characteristic of the level), (2) detects the multipaths from multipath signals $MP_1$, $MP_2$, $MP_3$, which are higher than a threshold level, by referring to the profile, (3) identifies delay times from signal occurrence times $t_1$, $t_2$, $t_3$ of respective paths of the multipaths or from a reference time, and (4) inputs despreading start timings and delay-time adjustment data to the fingers $2_1$, $2_2$, $2_3$ that correspond to the respective paths.

The searcher 1 includes a matched filter 1a, which outputs the autocorrelation of a desired signal contained in the received signal. FIG. 16A illustrates the construction of one channel of a base station. That is, the reception output of the antenna 3 contains other channel components as well. The matched filter 1a uses the spreading code of its own channel to extract the signal component of its own channel from the antenna reception signal. The extracted signal component is delivered as the output. More specifically, when a direct sequence signal (DS signal) that has experienced multipath effects enters the matched filter 1a, the latter outputs a pulse train having a plurality of peaks conforming to arrival times and signal strengths and stores the pulse train in a RAM 1c via a low-pass filter 1b. A path detector 1d refers to the profile (FIG. 16B) that has been stored in the RAM 1c to detect each path constituting the multipaths as well as the delay times, and inputs the start signals, which indicate the timings (chip synchronization timings) of the start of despreading, as well as the delay time adjustment data, to the fingers $2_1$, $2_2$, $2_3$ corresponding to the paths.

The fingers $2_1$, $2_2$, $2_3$ corresponding to the respective paths are identically constructed and each includes a spreading code generator 2a for generating the spreading code assigned to its own channel, a multiplier 2b for multiplying the antenna reception signal by the spreading code to thereby despread the signal, a dump integrator 2c for performing dump integration, a delay time adjustment unit 2d for subjecting the despread signal to a time delay adjustment that conforms to the path, an arithmetic unit 2e which performs an operation for channel estimation, and a multiplier 2f for multiplying the input to the arithmetic unit 2e by the complex conjugate of the output thereof to compensate the fading channel and output a desired signal wave component corresponding to the channel. The complex conjugate is obtained by reversing the sign of the imaginary part of the complex number. If the complex number is I+jQ, then the complex conjugate thereof is I−jQ.

FIG. 17 is a diagram useful in describing the channel estimation and compensation operation. Shown in FIG. 17 is a transmitting antenna 3' of a mobile station, the antenna 3 of the base station, the arithmetic unit 2e that performs the operation for channel estimation of the finger, the multiplier 2f, and a complex conjugate arithmetic unit 2f' for outputting the complex conjugate. Let s represent a signal transmitted from the transmitting antenna 3' to the destination of the base station, ξ the influence of the wireless path and r the reception output of the base station. The arithmetic unit 2e outputs the product rs* of the input signal r and desired signal s. Accordingly, the output of the arithmetic unit 2e is $$rs^* = s\xi s^* = \xi|s|^2 \xi$$

If there is no fluctuation in amplitude, the output of the complex conjugate arithmetic unit 2f' becomes ξ*, and the output of the multiplier 2f becomes $$r\xi^* = s\xi\xi^* = s|\xi|^2 s$$

In other words, if the amplitude does not fluctuate, the signal s that was transmitted to itself is obtained from the multiplier 2f. Accordingly, the arithmetic unit 2e and multiplier 2f in FIG. 16A estimate and output the signal component of their own channel.

Thus, the fingers $2_1$–$2_3$ corresponding to the respective multipaths despread the corresponding multipath signals $MP_1$–$MP_3$ by multiplying them by the spreading codes allocated to the channels and adjust the delays of the despread signals by the path delay times to make the timings agree. The Rake combiner 4 performs maximum-ratio combining of the finger outputs, and the discriminator 5 discriminates the received data based upon the output of the combiner.

Base station antennas of DS-CDMA communications system currently employ sector antennas. When the 360° perimeter of an antenna is equally divided into a plurality of sectors, the antenna that is allocated to each sector is referred to as a sector antenna. Since there is no directionality within a sector, the antenna is susceptible to interference from other users. Such interference from other users is the main cause of a decline in channel capacity and transmission quality. Research and development in regard to adaptive array antennas is being carried out in an effort to discover techniques for reducing such interference and improving transmission quality. The adaptive array technique involves receiving signals by a plurality of antenna elements and combining the signals from each of the antenna elements upon optimally weighting the signals, thereby reducing interference signals on the receiving side.

Applying an adaptive array antenna (AAA) system makes it possible to obtain multiple beams within a sector and has the effect of raising gain by sharpening the beam patterns and of reducing interference in the area. As a result, it is possible to increase the number of users capable of being accommodated by a single cell or to improve communication quality.

A method indicated in the paper "Characteristic of Discrimination-Feedback Coherent Adaptive Diversity in DS-CDMA", TECHNICAL REPORT OF IEICE, RCS96-102 (1996-11) has been disclosed as an example of art in which AAA is applied to a wireless base station in a DS-CDMA mobile communications system. In order to raise signal precision by spreading gain, the conventional method (1) combines signals obtained by subjecting the signals received by the antennas to despreading processing, (2) then subjects the combined signal to Rake reception processing and performs data discrimination based upon the results of processing and (3) feeds back the results of discrimination and operates on the original signal to calculate an adaptive weight. With this conventional method, however, all elements of the DS-CDMA mobile communications system inclusive of the Rake receiver, which is one of the basic components, must be changed to those for an adaptive array antenna and it is difficult to make use of the equipment, especially the Rake receiver, employed in the wireless base station of the usual DS-CDMA mobile communications system. Consequently, the state of the art is such that the conventional method does not make possible the smooth introduction of the AAA system.

Thus, the conventional AAA system for improving the performance of the wireless base station in a DS-CDMA mobile communications system is such that almost all of the base station equipment must be replaced with AAA-compatible equipment. This has a major impact upon the cost of the wireless base station equipment and hinders the introduction of AAA systems.

SUMMARY OF THE INVENTION

The present invention has been devised in view of the foregoing problem and its object is to adopt an arrangement in which an AAA system can be introduced in front-end fashion even in a case where an AAA system is introduced to the wireless base station of an ordinary DS-CDMA mobile communications system, thereby minimizing modification of existing equipment to facilitate the introduction of AAA systems.

Another object of the present invention is to decide an adaptive weight in feed-forward fashion so that an AAA system can be used without modifying the conventional Rake receiver.

A further object of the present invention is to provide an array antenna system so adapted that the phases of signals received by the antenna elements of an array antenna are made the same so that a beam is pointed adaptively in the direction of an arrival angle.

Still another object of the present invention is to make possible an improvement in control precision, an improvement in gain and a reduction in interference in the area, as a result of which the number of users capable of being accommodated by a single cell is increased and communication quality is improved.

In accordance with a first aspect of the present invention, the foregoing objects are attained by providing an array antenna system comprising (1) means for applying a correlation operation to an output signal from each antenna element and calculating a correlation signal that is correlated with a signal transmitted from a mobile station of interest; (2) means for calculating adaptive weights for obtaining in-phase correlation signals from the respective antenna outputs; (3) means for causing the adaptive weight calculated for each antenna element to act upon an output signal from the corresponding antenna element and combining the resulting signals; and (4) means for despreading the combined signal and discriminating data. In accordance with this array antenna system, it is possible to minimize modification of the existing system and facilitate the transition to an AAA system in a base station.

In accordance with a second aspect of the present invention, the foregoing objects are attained by providing an array antenna system comprising (1) means for applying a correlation operation to an output signal from each antenna element and calculating a correlation signal that is correlated with a signal transmitted from a mobile station of interest, this being carried out for each signal that arrives via each path of multipaths from the mobile station of interest to the array antenna; (2) arithmetic means for calculating an adaptive weight for obtaining in-phase correlation signals from the respective antenna outputs, this being carried out for each signal that arrives via each path of multipaths from the mobile station of interest to the array antenna; (3) combining means provided for each path of multipaths from the mobile station to the antenna array for causing an adaptive weight calculated for every path and each antenna element to act upon an output signal from the corresponding antenna element and combining the resulting products; and (4) a Rake receiver having despreading means for despreading signal outputs by respective ones of the combining means and a combining unit for combining signals output by each of the despreading means upon applying a delay time adjustment thereto. In accordance with this array antenna system, it is unnecessary to use the result of discrimination of received data upon feeding back the data. Adaptive weights are capable of being decided and act upon the output signals from the corresponding antenna elements in feed-forward fashion, thus making it possible to construct an AAA system without modifying the Rake receiver in any way. As a result, a conventional Rake receiver can be used as is and the transition to use of an AAA system in a base station is facilitated.

The means for calculating adaptive weights decides adaptive weights in such a manner that the phases of correlation signals of all antenna elements are made the same as the phase of the correlation signal of a prescribed antenna element. This makes it possible to point a beam adaptively in the direction of the angle of arrival. As a result, it is possible to raise the gain and reduce interference in the area, increase the number of users that can be accommodated by one cell and improve communication quality. In this case, if the phases are made the same as that of the correlation signal for which the power level is highest, then the phases will agree with the antenna whose signal is strongest, i.e., for which the reliability is highest. This makes it possible to raise the accuracy of beam control in the AAA system.

Further, the means for calculating the adaptive weights calculates an adaptive weight for each antenna element using a directional constraint vector C and a covariance matrix R. This makes it possible to make the phases of all correlation signals the same and to reduce the power of received interference waves.

Further, control precision by an AAA system can be improved by calculating adaptive weights using an average value of correlation signals per prescribed time.

Further, from among the correlation signals obtained from the output signals of respective antenna elements, sets of two correlation signals each are formed in order of descending reception level and a phase difference between the correlation signals in each set is averaged upon applying weighting conforming to the reception level, thereby calculating the phase difference between correlation signals of neighboring antenna elements. Adaptive weights are calculated using the phase difference calculated. This makes it possible to raise the control accuracy of the AAA system.

Further, beam forming is applied before the correlation signal of each antenna element is calculated, thereby narrowing the beam. As a result, interference is reduced. By applying processing that is the opposite of beam forming to an obtained correlation signal to thereby restore the original signal received by the antenna, the control precision of the AAA system can be improved even if traffic increases.

Other features and advantages of the present invention will be apparent from the following description taken in conjunction with the accompanying drawings.

BRIEF DESCRIPTION OF THE DRAWINGS

DESCRIPTION OF THE PREFERRED EMBODIMENTS (A) Overview of the present invention FIG. 1 is a diagram useful in describing a base station according to the present invention. Shown in FIG. 1 are a receiving array antenna 1 having n-number of antenna elements $1_1$–$1_n$, and receiving circuits (RV) $2_1$–$2_n$ each having a radio-frequency amplifier, a frequency converter, a quadrature demodulator and an A/D converter, etc., for (1) frequency-converting an RF signal, which is the antenna output, to a signal in the IF band, (2) separating the signal into I and Q signals by performing quasi-synchronous detection using the quadrature demodulator, and (3) converting the demodulated analog I, Q signals to digital signals and outputting the digital signals. It should be noted that the position at which the A/D conversion is performed is not particularly limited. For example, the A/D converter may be placed in front of the quadrature demodulator. Further, the array antenna 1 and the receiving circuits $2_1$–$2_n$ are shared by all channels.

A searcher 3 functions to search despread start timing (chip synchronization timing) and to select a Rake combination path and, at the same time, calculates and decides a vector and a matrix using correlation signals in order to calculate adaptive weights. An adaptive weight calculating unit (AWC) 4 calculates adaptive weights from the vector and matrix obtained by the searcher 3. A beam former 5 multiplies the signals of a selected path prior to despreading by the weights obtained in the adaptive-weight calculating unit 4 and combines the products. The output of the beam former 5 is applied to an ordinary DS-CDMA Rake receiver 6. The searcher 3, adaptive weight calculating unit 4, beam former 5 and Rake receiver 6 are provided for each channel.

The searcher 3 (1) searches for chip synchronization timings and delay-time adjustment data by a correlation operation using matched filters (MF) or the like, (2) obtains a correlation signal from the signal received from each antenna element, and (3) calculates a vector and a matrix necessary to perform adaptive control of the antenna using the correlation signals and inputs the vector and matrix to the adaptive weight calculating unit 4. The adaptive weight calculating unit 4 calculates adaptive weights from the entered vector and matrix, etc., and the beam former 5 applies amplitude control and phase rotation control based upon the calculated weights to the signals of the selected paths prior to despreading, combines the results and outputs the resulting signal to the Rake receiver 6. As a result of this operation, the path arrival direction of a user signal is estimated from the correlation signals and the signals received by each of the antennas are multiplied by the weights at arbitrary times (e.g., every several symbols) in such a manner that the antenna beam is pointed in the direction estimated from this information, thereby pursuing the user.

Figure 1:
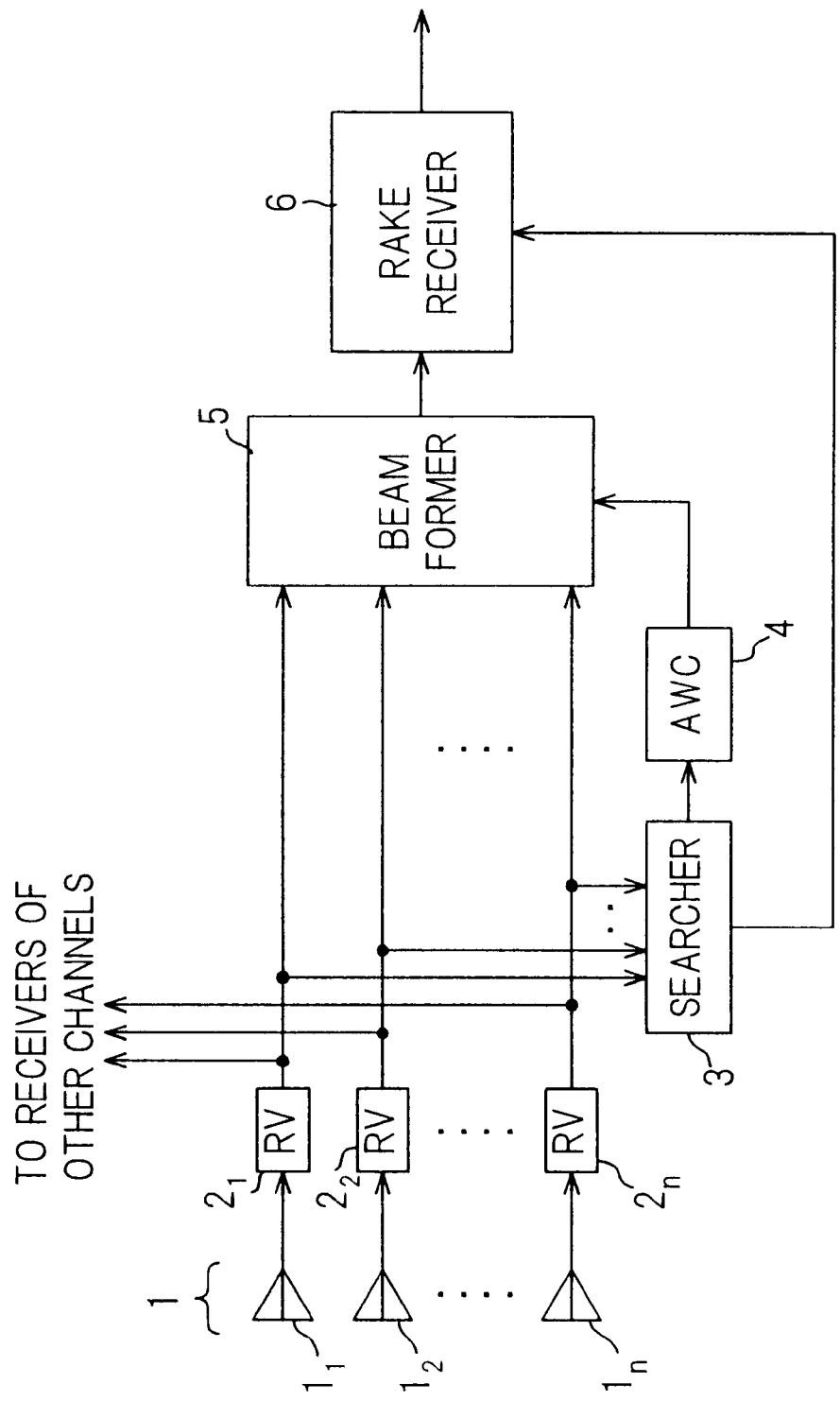
FIG. 1 is a block diagram for describing an overview of the present invention.

In accordance with the arrangement of FIG. 1, it is possible to calculate the weights by feed-forward control. In other words, by incorporating the front-end AAA system of FIG. 1 in a DS-CDMA base station, the Rake receiver 6, which is a basic constituent of the base station, can be used as before without requiring any modification whatsoever.

Figure 2A:
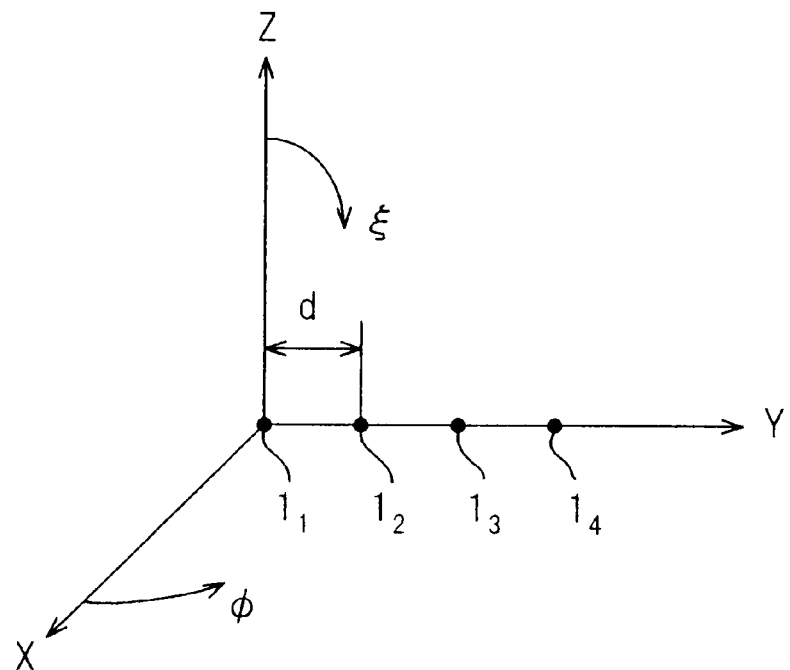
FIGS. 2A, 2B are diagrams useful in describing a linear antenna.
Figure 2B:
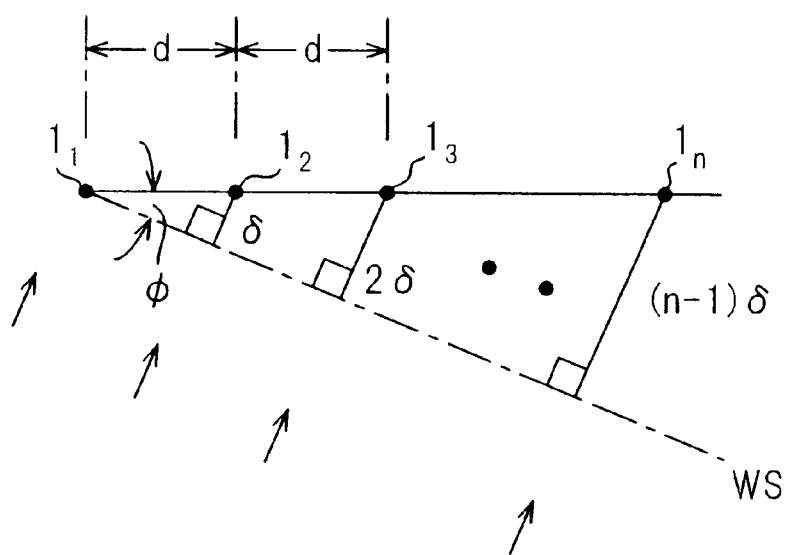

For example, consider one sector of a cell that has been divided into sectors. Let k represent the number of users in the area of this sector, and let n represent the number of antenna elements of the sector array antenna. Correlation signals $X1_i(t), X2_i(t), \ldots, Xn_i(t)$ of the received signals on any path (multipath) from a user i observed by the searcher 3 of the receiver shown in FIG. 1 are as follows in the case of a linear antenna of the kind shown in FIGS. 2A, 2B:

$$X1_i(t) = I1_i + jQ1_i = a1_i(t)\exp[j(\alpha i(t))] \tag{1}$$
$$X2_i(t) = I2_i + jQ2_i = a2_i(t)\exp[j(\alpha_i(t) + \Delta\theta_i)]$$
$$Xn_i(t) = In_i + jQn_i = an_i(t)\exp[j(\alpha_i(t) + (n-1)\Delta\theta_i)]$$

where t: time at which arbitrary path is observed;

$an_i(t)$: amplitude of correlation signal of signal which nth antenna receives from ith user (i=1, 2, ..., k);

$\alpha_i(t)$: phase of correlation signal of signal which first antenna serving as reference receives from ith user (i=1, 2, ..., k); and $\Delta\theta_i$: phase rotation decided by antenna arrangement and angle of arriving wave from ith user, where $X1_i(t)$ serves as the reference.

The reason for obtaining Equations (1) as the correlation signals is as follows: If we assume that radio waves of the ith user arrive from directions $\xi, \phi$ in FIG. 2A, then distances from a wave front WS to the antenna elements $1_1$-$1_n$ will be $0, \delta, 2\delta, \ldots, (n-1) \delta$, respectively. If d represents antenna element spacing and $\lambda$ the wavelength, then $\delta$ will be as follows:

$$\delta = d \cdot \sin \phi$$

Accordingly, times corresponding to the distances $\delta$—(n−1)$\delta$ are required for radio waves to arrive at the antennas $1_2$-$1_n$ after radio waves arrive at the antenna $1_1$. Since the radio waves are inclined at the angle $\xi$ with respect to the XY plane, a phase difference corresponding to $$\Delta\theta_i = (2\pi/\lambda) \cdot d \cdot \sin \phi \cdot \sin \xi$$

develops between the first antenna element and the second antenna element, a phase difference of $2\Delta\theta_i$ between the first antenna element and the third antenna element and a phase difference of $(n-1)\Delta\theta_i$ between the first antenna element and the nth antenna element. As a result, the phase signals $X1_i(t), X2_i(t), \ldots, Xn_i(t)$ obtained from the signals received by the respective antennas are as indicated by Equations (1) when the first antenna element $1_1$ is made the reference.

According to the present invention, signals, prior to despreading, that enter the Rake receiver 6 for each path of each user are subjected to adaptive control based upon the output of the searcher 3 of each user (channel), whereby a feed-forward AAA system is constructed.

(B) Embodiment (a) Overall configuration

Figure 3:
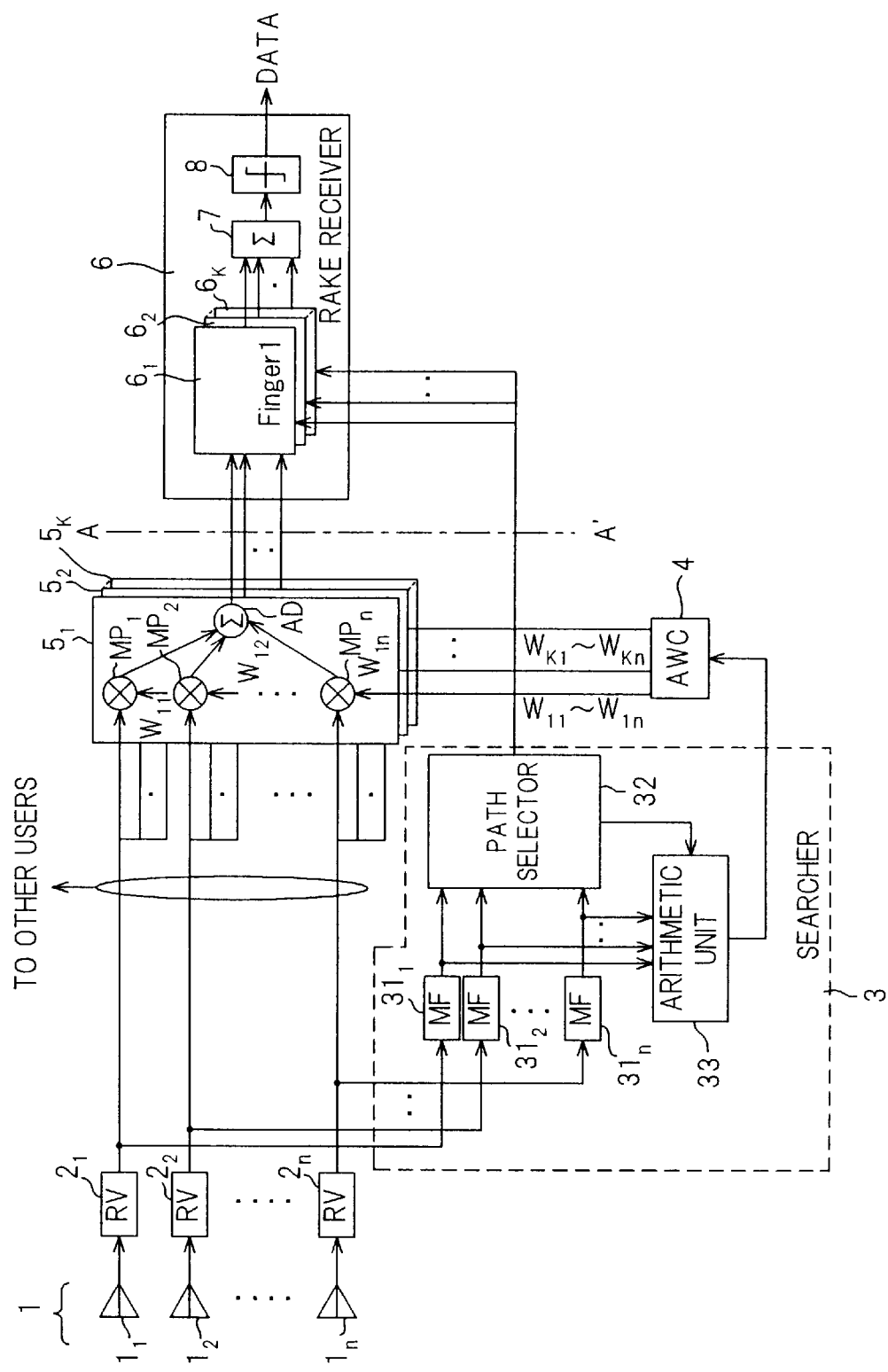
FIG. 3 is a block diagram showing the configuration of an array antenna system according to the present invention.

FIG. 3 is a block diagram illustrating an embodiment of an array antenna system according to the present invention. Only the circuitry for one user (channel) is shown. Components identical with those shown in FIG. 1 are designated by like reference characters.

The system includes the receiving array antenna 1 having the n-number of antenna elements $1_1$-$1_n$, and the receiving circuits (RV) $2_1$-$2_n$ each having a radio-frequency amplifier, a frequency converter, a quadrature demodulator and an A/D converter, etc. The array antenna 1 and the receiving circuits $2_1$-$2_n$ are shared by all channels.

The searcher 3 functions (1) to search chip synchronization timing and selection of Rake combination path and (2) to calculate a vector and a matrix, which are for calculation of adaptive weights, in time sharing fashion using correlation signals. The function (1) of the searcher 3 is the well-known function as described above in connection with FIGS. 16A, 16B. In order to simplify the description, therefore, the detailed arrangement for implementing this function will not be illustrated below. It should be noted, however, that this function is executed by a path selector 32 in a manner described later.

The adaptive weight calculating unit (AWC) 4 calculates adaptive weights $Wi_1, Wi_2, \ldots, Wi_n$ (i=1, 2, ..., K, where K represents the number of paths of the multipaths) in time sharing fashion using the vector and matrix, etc., which are for each path of the multipaths, set by the searcher 3. Beam formers $5_1$-$5_K$ are provided for respective ones of the paths and each includes multipliers $MP_1$-$MP_n$, which multiply the output signals of the antenna elements $1_1$-$1_n$ prior to despreading by the adaptive weights $Wi_1, Wi_2, \ldots, Wi_n$ (i=1, 2, ..., K) calculated by the adaptive weight calculating unit 4, and an adder AD for adding the outputs of the multipliers.

Figure 16A:
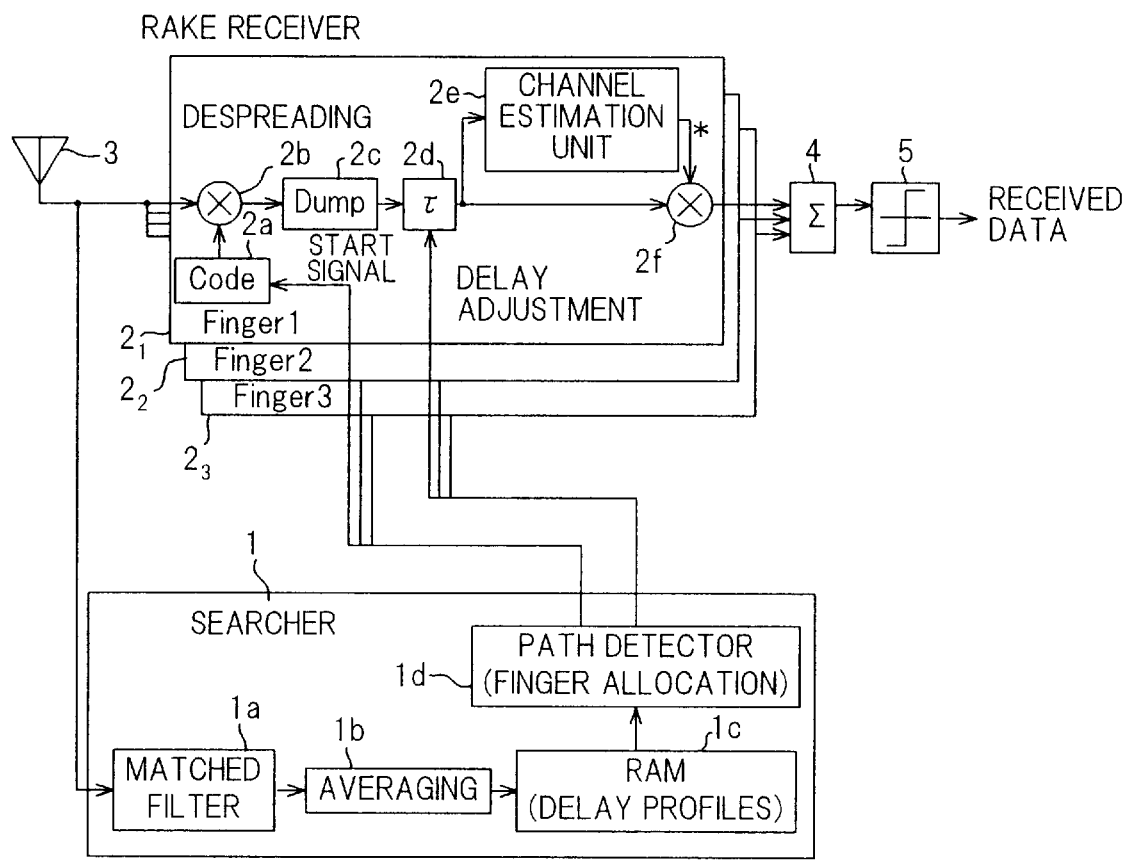
FIGS. 16A, 16B are diagrams useful in describing a Rake receiver according to the prior art.
Figure 16B:
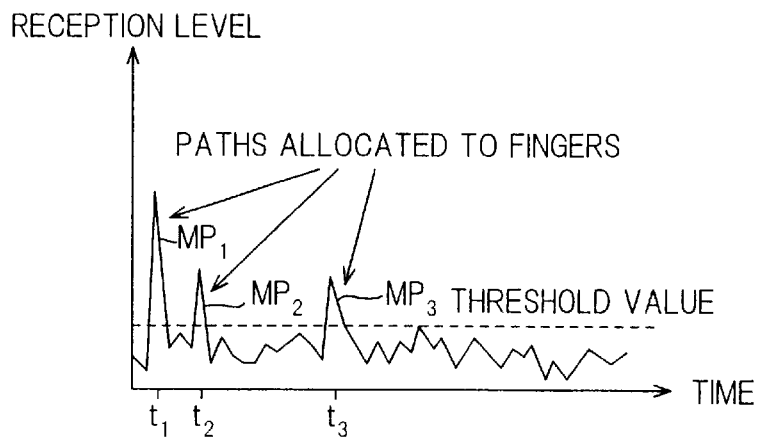
Figure 17:
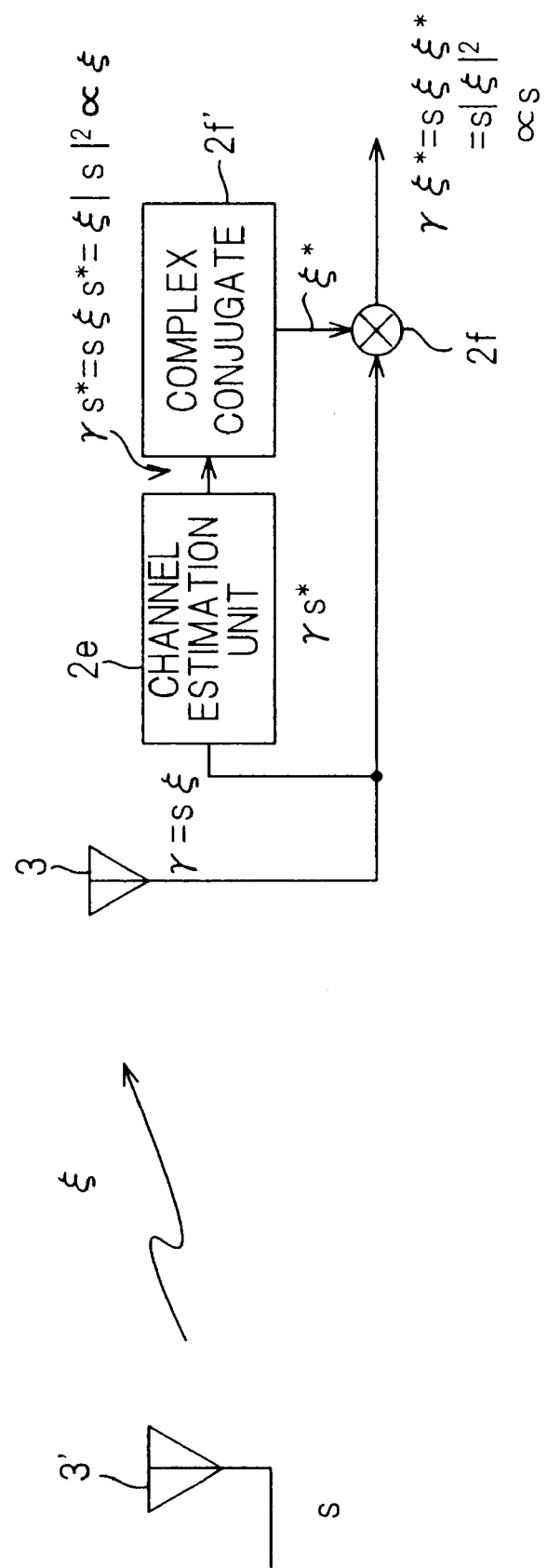
FIG. 17 is a diagram useful in describing channel estimation calculation.

The ordinary DS-CDMA Rake receiver 6 has the construction shown in FIG. 16A and includes fingers $6_1$-$6_K$, a Rake combiner 7 for combining the outputs of the fingers by maximum-ratio combining, and a data discriminator unit 8. The fingers $6_1$-$6_K$ include (1) despreaders for despreading the signals input from the respective beam formers $5_1$-$5_K$ by multiplying these signals by spreading codes, (2) delay time adjustment units for performing an adjustment of delay time conforming to the path, and (3) channel estimation units for performing a channel estimating operation. The means (1), (2) and (3) are not shown.

(b) Searcher

The searcher 3 has matched filters (MF) $31_1$-$31_n$ for extracting the correlation signals $X1_i(t), X2_i(t), \ldots, Xn_i(t)$, which are indicated by Equations (1), using the I, Q quadrature data output by the receiving circuits $2_1$-$2_n$ of the antenna elements $11$-$1n$, respectively; a path selector 32 which functions (1) to search chip synchronization timing and select the Rake combination path, (2) to detect the correlation signal of maximum power from among the correlation signals $X1_i(t), X2_i(t), \ldots, Xn_i(t)$ for an arithmetic unit 33, and (3) to provide calculation start timing. The arithmetic unit 33 calculates a vector and a matrix for calculation of adaptive weights and inputs the results of calculation to the adaptive weight calculating unit 4. Though the arithmetic unit 33 is illustrated as being separate of the adaptive weight calculating unit 4, the two may be combined to form the adaptive weight calculating unit.

(c) Adaptive control for obtaining in-phase antenna output signals

When the following equation:

$$Yn_i(t) = Xn_i(t) \cdot X^* 1_i(t) = a1_i(t) \cdot an_i(t)\exp[j\{(n-1)\Delta\theta_i\}] \tag{2}$$

is calculated using the correlation signals of Equations (1), the phase term of $Yn_i(t)$ in the above-mentioned equation is the phase difference between the received signals of the first antenna element and nth antenna element or the phase difference between the correlation signals. The phase term $\Delta\theta_i$ of $Yn_i(t)$ is phase rotation based upon the arrangement of a linear array antenna calculated from the direction of arrival of a wave from a user i. That is, if coordinates are adopted as shown in FIG. 2, we have $$\Delta\theta_i = (2\pi/\lambda) \cdot d \cdot \sin \phi_i \cdot \sin \xi_i \tag{3}$$

where d: antenna element spacing $\phi_i$: Horizontal arrival angle for ith user $\xi_i$: Vertical arrival angle for ith user Accordingly, when the complex conjugate $Y^*n_i(t)$ of $Yn_i(t)$ in Equation (2) is calculated, we have $$Y^*n_i(t)=a1_i(t) \cdot an_i(t)\exp[-j\{(n-1)\Delta\theta_i\}] \quad (4)$$

If Equation (4) is multiplied by $Xn_i(t)$ of Equation (1), then we have $$Xn_i(t) \cdot Y^*n_i(t)=a1_i(t) \cdot an_i(t)^2 \exp[j(\alpha i(t))] \quad (5)$$

The signal of Equation (5) has the same phase as that of the correlation signal $X1_i(t)$ of the first antenna element. Thus, by making $Xn_i(t)$ in Equation (2) equal to $X2_i(t)$, $X3_i(t), \ldots Xn-1_i(t)$, $Xn_i(t)$ successively, the outputs of all antenna elements can be put in phase by Equations (4) and (5). In other words, if $$Y^*1_i(t), Y^*2_i(t), Y^*3_i(t), \ldots, Y^*n_i(t)$$

obtained from Equation (4) are made the adaptive weights $$W_{i1}, W_{i2}, W_{i3}, \ldots, W_{in}$$

respectively, then the outputs of all antenna elements can be made to have the same phase.

Thus, the arithmetic unit 33 obtains $$Y1_i(t), Y2_i(t), Y3_i(t), \ldots, Yn_i(t)$$

from Equation (2) at the timing of the initial path of the multipaths and inputs these to the adaptive weight calculating unit 4. The latter obtains the complex conjugates $$Y^*1_i(t), Y^*2_i(t), Y^*3_i(t) \ldots, Y^*n_i(t)$$

of the entered $Y1_i(t), Y2_i(t), Y3_i(t), \ldots, Yn_i(t)$ and inputs these to the beam former $5_1$ as the adaptive weights $$W_{11}, W_{12}, W_{13}, \ldots W_{1n}$$

respectively. The beam former $5_1$ multiplies the output signals of the antenna elements $1_1-1_n$ prior to despreading by the weights $$W_{11}, W_{12}, W_{13}, \ldots W_{1n}$$

respectively, combines the products and inputs the result to the first finger $6_1$.

Thereafter, and in similar fashion, the arithmetic unit 33 successively obtains $$Y1_i(t), Y2_i(t), Y3_i(t), \ldots Yn_i(t)$$

from Equation (2) at the timings of the second, third, . . . Kth paths of the multipaths, and the adaptive weight calculating unit 4 calculates the adaptive weights $$W_{i1}, W_{i2}, W_{i3}, \ldots, W_{in}$$

(i=2–K) and inputs these adaptive weights to the beam formers $5_2-5_K$. The beam formers $5_2-5_K$ multiply the output signals of the antenna elements $1_1-1_n$ prior to despreading by the weights $$W_{i1}, W_{i2}, W_{i3}, \ldots W_{in}$$

respectively, combine the products and input the results to the second—Kth fingers $6_1-6_K$ of the Rake receiver 6.

The fingers $6_1-6_K$ despread their input signals, apply a delay time adjustment conforming to the path of the multipaths and output the resulting signals at the same time. The Rake combiner 7 combines the outputs of the fingers $6_1-6_K$ and the data discriminator unit 8 discriminates the received data based upon the combined signal.

If the arrangement described above is adopted, the outputs of all antenna elements can be make to have the same phase and the beam can be pointed adaptively in the direction of the arrival angle.

If an interface is provided at A–A' in FIG. 3, the Rake receiver used may have the standard construction as a matter of course and can be utilized in an AAA system as well. In an AAA system, signals that have been subjected to AAA processing are input to each of the finger circuits and subsequent processing has a flow identical with that of the usual Rake receiver. This makes it possible to utilize the Rake receiver of the standard system in the AAA system as well.

Figure 4:
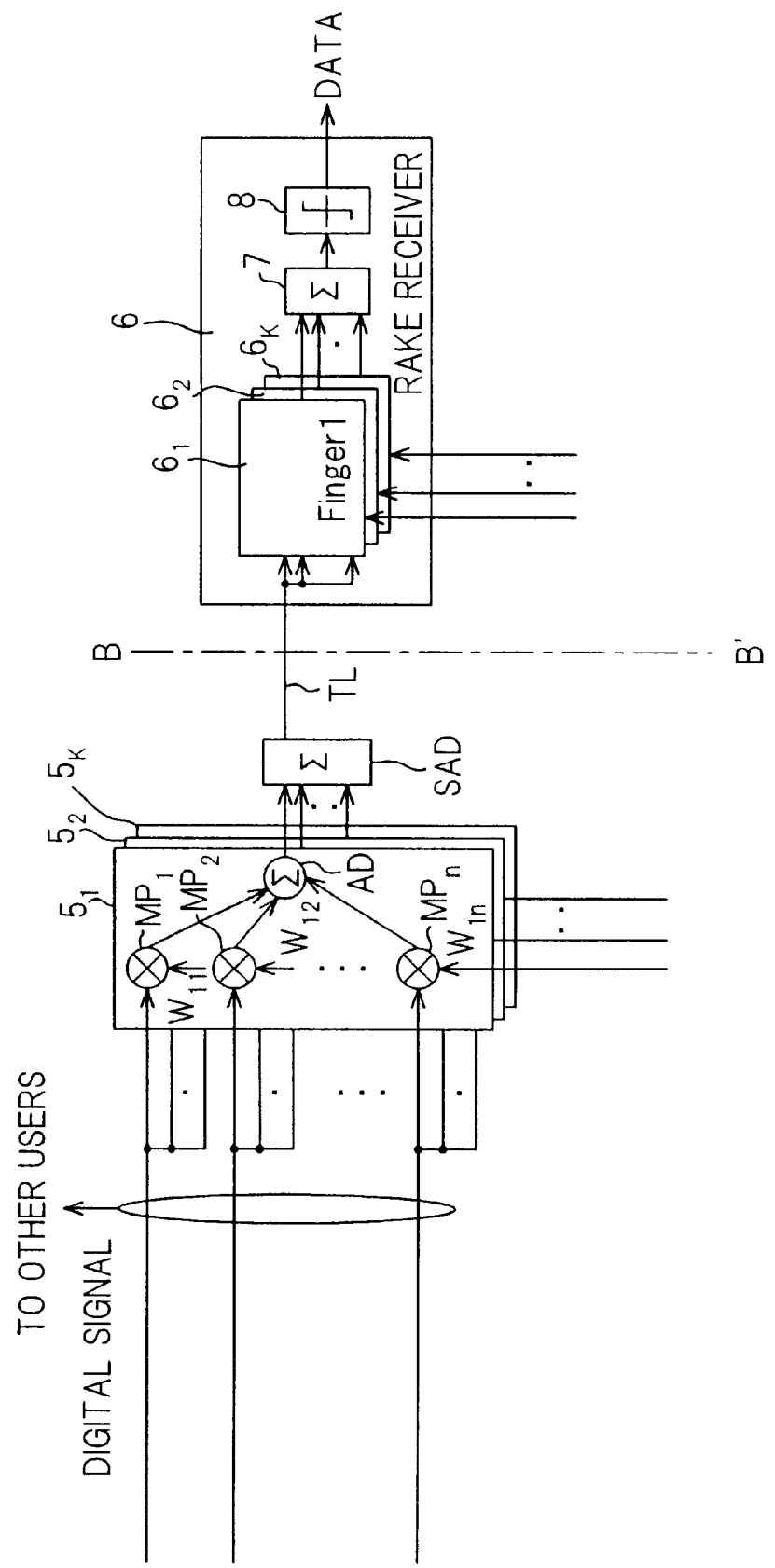
FIG. 4 is a block diagram showing a modification of the array antenna according to the present invention.
Figure 5:
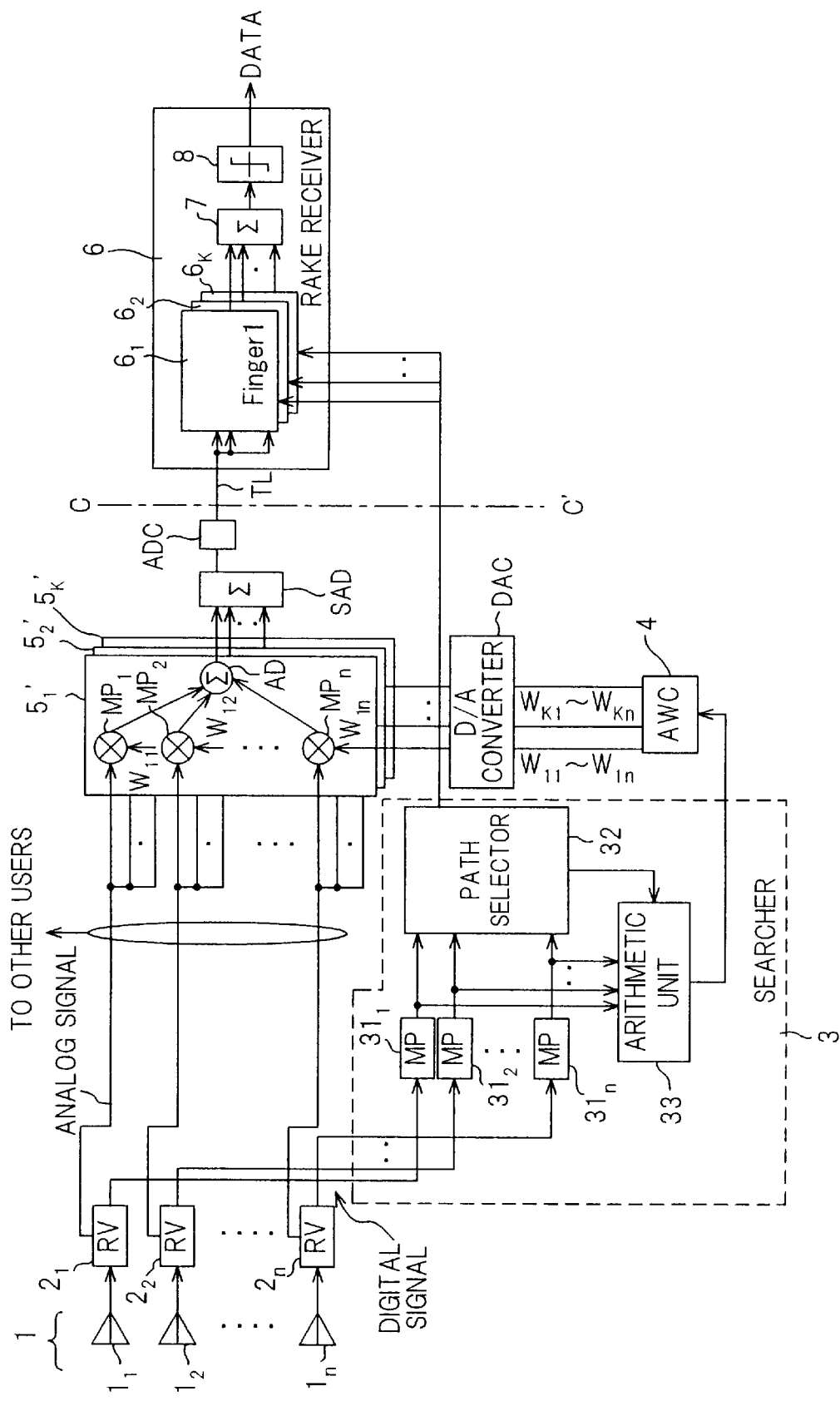
FIG. 5 is a block diagram showing another modification of the array antenna according to the present invention.
Figure 6:
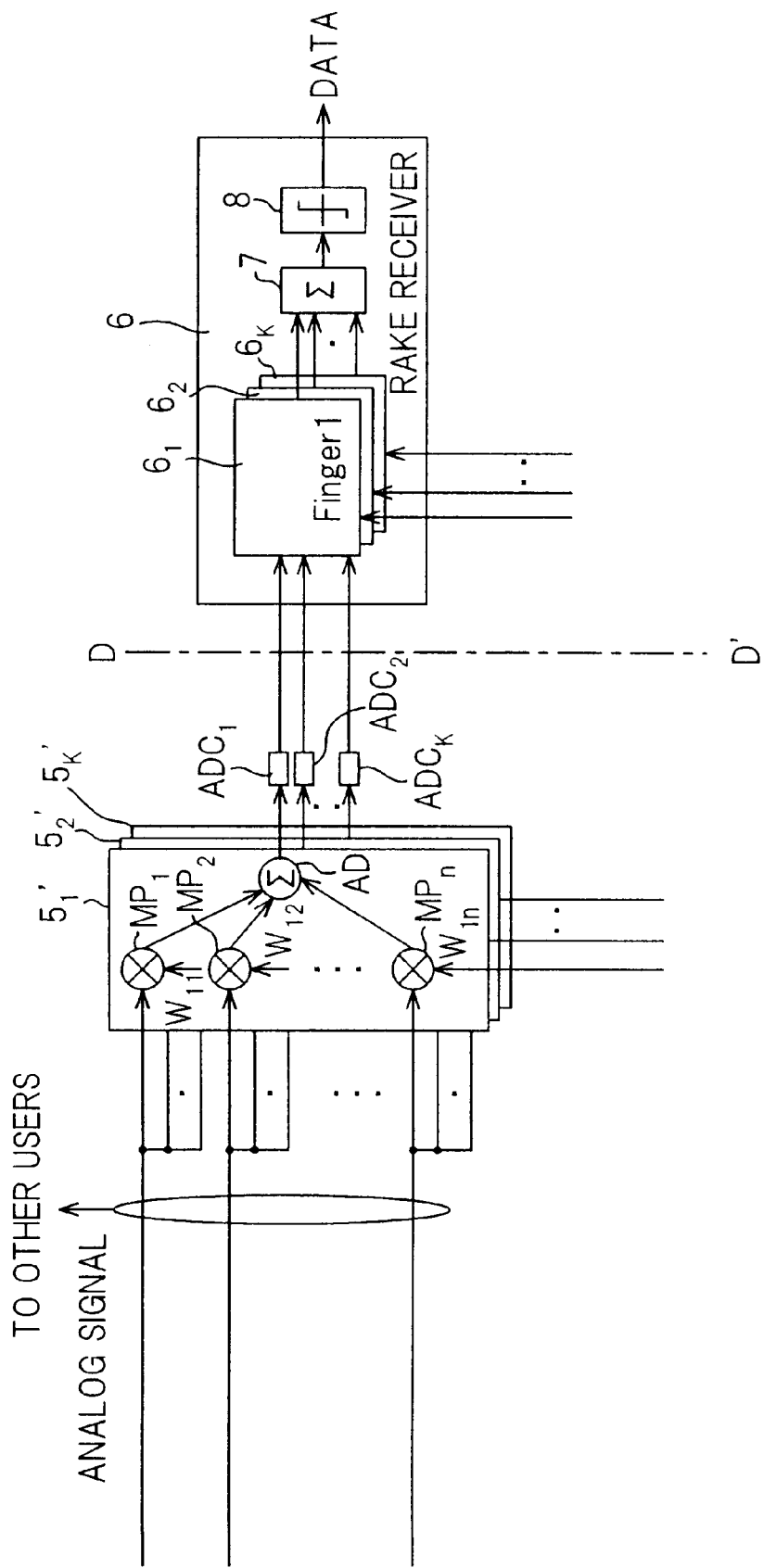
FIG. 6 is a block diagram showing yet another modification of the array antenna according to the present invention.

Various interface conditions are conceivable and the interface is not limited to A–A'. Other examples are shown in FIGS. 4, 5 and 6. FIG. 4 shows a modification having an interface B–B', which reduces the signal lines to the Rake receiver 6. Here the digital signals of respective paths output by the beam formers $5_1-5_K$ are combined by a combiner SAD so that a signal is sent to the Rake receiver 6 over a single signal line TL. Though not shown, a searcher and adaptive weight arithmetic unit similar to those shown in FIG. 3 are provided in FIG. 4.

FIG. 5 shows another modification having an interface C–C' for reducing signal lines to the Rake receiver 6. In FIG. 5 the beam formers have an analog construction. The analog signals of the paths output by beam formers $5_1'-5_K'40$ are combined by a combiner SAD, after which the output of the combiner SAD is converted to a digital signal by an A/D converter ADC. The digital signal is sent to the Rake receiver 6 by a single signal line TL. Weight calculation is performed digitally, the weights obtained are converted to analog signals by the D/A converter DAC and the analog signals enter the analog beam formers $5_1'-5_K'$. The receiving circuits $2_1-2_n$ input their quadrature detection outputs to the analog beam formers $5_1'-5_K'$ as analog signals. Before these outputs are input to the searcher 3, however, they are converted from analog to digital signals.

FIG. 6 shows another modification having an interface D–D'. In the modification of FIG. 6, the analog signals of respective paths output by the analog beam formers $5_1'-5_K'$ are converted from analog to digital signals by A/D converters $ADC_1-ADC_K$ without being combined, and the resulting digital signals are sent to the Rake receiver 6. Though not shown, a searcher and adaptive weight arithmetic unit similar to those shown in FIG. 5 are provided in FIG. 6.

In the foregoing, the outputs of all antenna elements are made to have the same phase as that of the first antenna output. However, an arrangement may be adopted in which the phases are made to agree with the antenna output having the strongest signal, i.e., the highest reliability. Such an arrangement improves the accuracy of beam control in the adaptive array antenna.

(d) Flow of processing for obtaining in-phase antenna output signals

Figure 7:
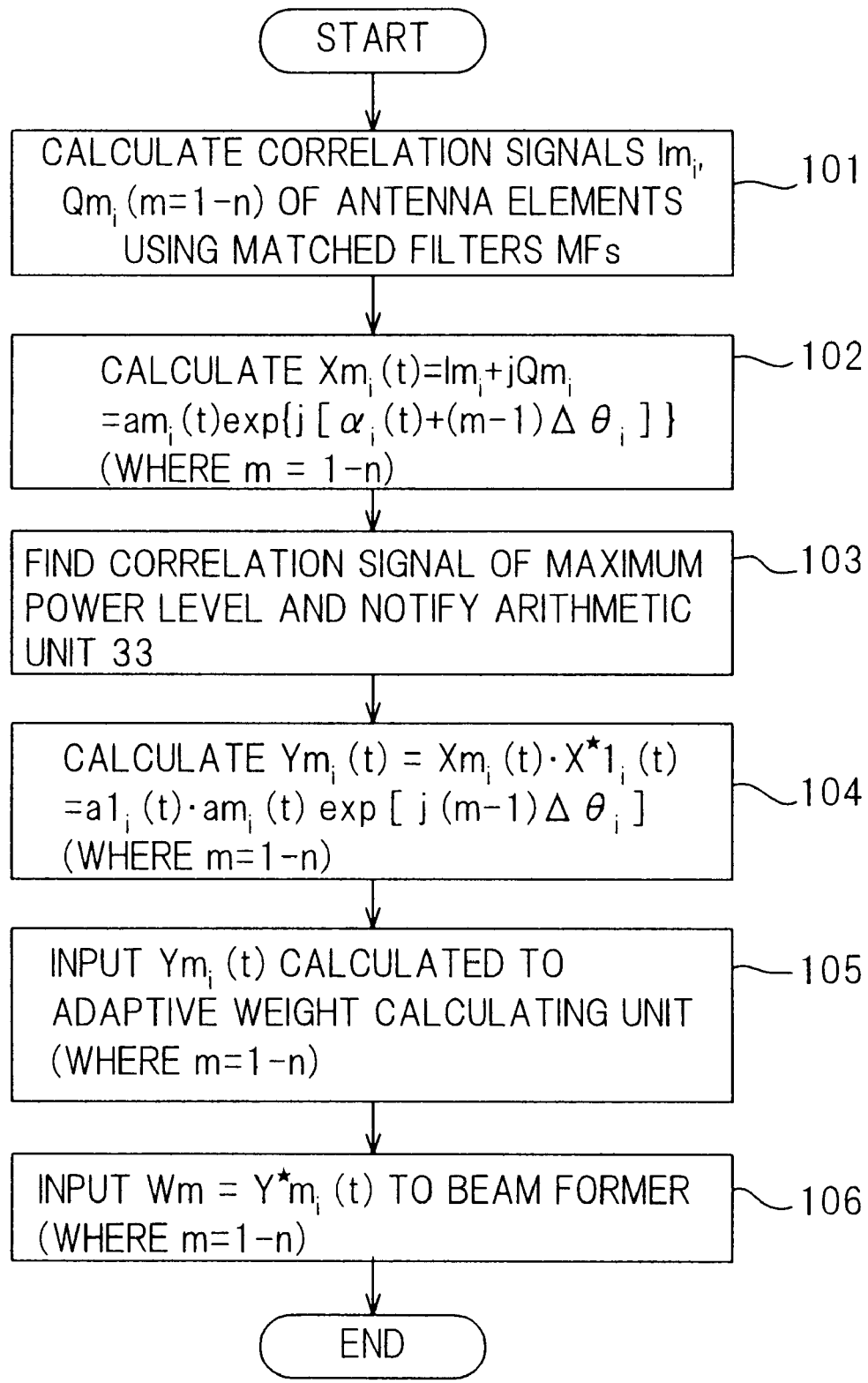
FIG. 7 is a flowchart of processing (phase control) for obtaining in-phase antenna output signals.

FIG. 7 is a flowchart of processing executed by the searcher and adaptive weight calculating unit for in-phase control.

The matched filters $31_1-31_n$ calculate correlation signals $Im_i$, $Qm_i$ (m=1–n) from the output signals of the antenna elements $1_1-1_n$ received from an ith user (step 101). Next, the correlation signals $Xm_i(t)$ of Equations (1) are obtained (step 102). The path selector 32 finds the correlation signal of largest power and notifies the arithmetic unit 33 (step 103). It will be assumed that the correlation signal of the first antenna has the largest power. Further, the path selector 32 instructs the arithmetic unit 33 of calculation start timing in dependence upon the delay time of each path of the multipaths.

In response to the calculation start indication, the arithmetic unit 33 obtains $$Y1_i(t), Y2_i(t), Y3_i(t), \ldots, Yn_i(t)$$

from Equation (2) at the timing of the initial path of the multipaths and inputs these to the adaptive weight calculating unit 4 (steps 104, 105). The latter obtains the complex conjugates $$Y^*1_i(t), Y^*2_i(t), Y^*3_i(t), \ldots, Y^*n_i(t)$$

of the entered $Y1_i(t), Y2_i(t), Y3_i(t), \ldots, Yn_i(t)$ and inputs these to the beam former $5_1$ as the adaptive weights $$W_{11}, W_{12}, W_{13}, \ldots, W_{1n}$$

respectively (step 106).

The searcher 3 and adaptive weight calculating unit 4 subsequently repeat the above-described processing in regard to the remaining paths of the multipaths.

Figure 8A:
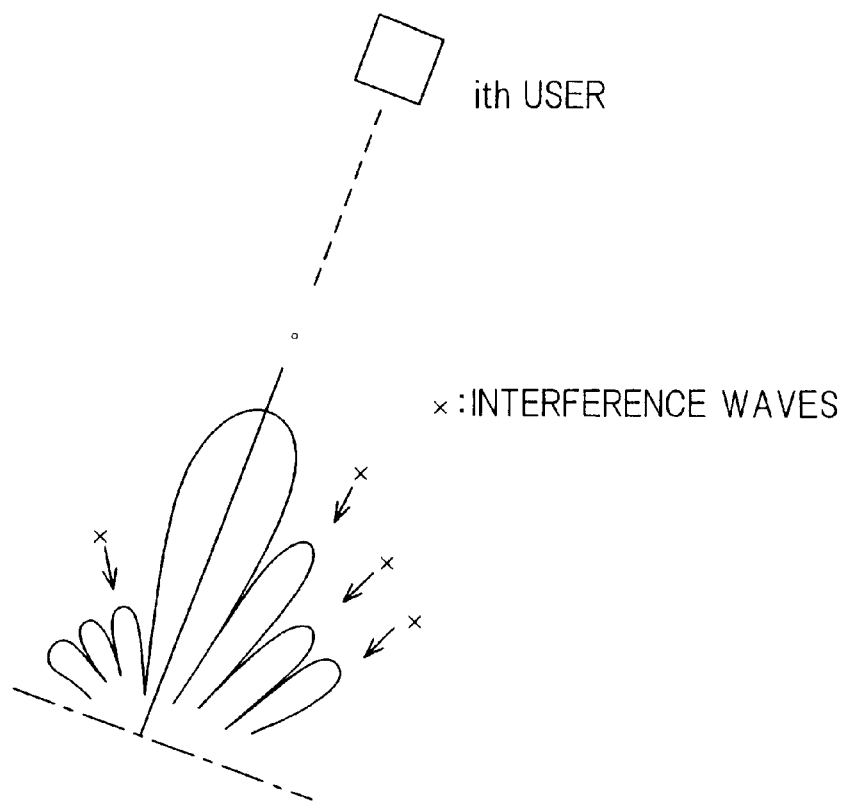
FIGS. 8A, 8B are diagrams useful in describing suppression of interference waves.
Figure 8B:
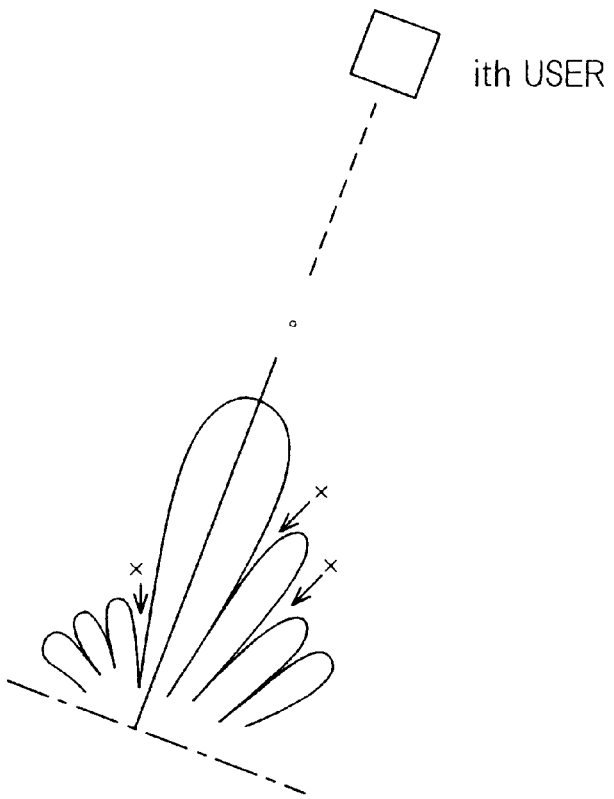

(e) Adaptive control, with accompanying amplitude control, for obtaining in-phase antenna output signals The above-described control makes it possible to point the beam of an array antenna (the direction of its directivity) in the direction of the path along which the user signal arrives. This raises gain and reduces interference within the area. However, there are still instances where the array antenna receives interference waves, as shown in FIG. 8A, and hence there is room for improvement. Accordingly, if control can be carried out so as to obtain in-phase antenna output signals and nullify interference waves as well, as shown in FIG. 8B, then the power of received interference waves can be made small. Such control will now be described.

By using $Yn_i(t)$ of Equation (2), values $Y1_i(t), Y2_i(t), \ldots, Yn_i(t)$ made to correspond to each n are obtained and are arrayed in accordance with the following equation:

$$C = [Y1_i(t), Y2_i(t), \ldots, Yn_i(t)]T \quad (6)$$

T: transposition to establish a directional constraint vector C. Further, a covariance matrix indicated by the following equation is generated from the correlation signals [Equations (1)] of the signals received by the antennas:

$$R(t) = \begin{bmatrix} <X*1_i(t) \cdot X1_i(t)> & <X*1_i(t) \cdot X2_i(t)> & \cdots & <X*1_i(t) \cdot Xn_i(t)> \\ <X*2_i(t) \cdot X1_i(t)> & <X*2_i(t) \cdot X2_i(t)> & \cdots & <X*2_i(t) \cdot Xn_i(t)> \\ \cdots & \cdots & & \cdots \\ <X*n_i(t) \cdot X1_i(t)> & <X*n_i(t) \cdot X2_i(t)> & \cdots & <X*n_i(t) \cdot Xn_i(t)> \end{bmatrix} \quad (7)$$

<·>: ensemble average

The adaptive algorithm used in the present invention requires a feed-forward control capability. Here the well-known directional constraint minimum power method (DCMP) is used as an example of such an algorithm. When DCMP is used, the adaptive weight W can be obtained as indicated by the following equations:

$$W = R^{-1}C^*(C^T R^{-1}C^*)^{-1}H \quad (8)$$

H = constraint response (=1 in this case)

Accordingly, an AAA system can be constructed using the arrangement of FIG. 3 by calculating adaptive weights at arbitrary time intervals for each and every user and on a per-path basis of the multipaths in accordance with Equation (8) and multiplying the signals, which prevail prior to despreading, by these weights. It should be noted that if feed-forward control can be performed using an adaptive algorithm other than DCMP, then such an algorithm can be utilized in the present invention and the invention therefore is not limited to DCMP.

It should be noted that any row or column vector of the covariance matrix R(t) includes phase-difference information in which any antenna serves as the reference. If this is used, therefore, an advantage obtained is that it will be unnecessary to set a directional constraint vector C in another block. In other words, though the directional constraint vector C used in the adaptive weight calculation is as indicated by Equations (2) and (6), this can be expressed based upon Equation (7) using one row or column of the covariance vector R. For example, the first row is the equivalent of an equation for calculating phase rotation based upon the arrangement of the array antenna when the first antenna is adopted as the reference. The phase can be determined after averaging processing is applied. Similarly, in regard to the second through nth rows, these are the equivalents of equations for calculating phase rotation in a case where the second through nth antennas are adopted as the reference. Further, the column vectors have a complex-conjugate relationship with respect to the row vectors and these also can be used. Thus, it is unnecessary to provide a block especially for calculating the directional constraint vector C, and an averaged directional constraint vector can be decided by generating the covariance matrix R.

Figure 9:
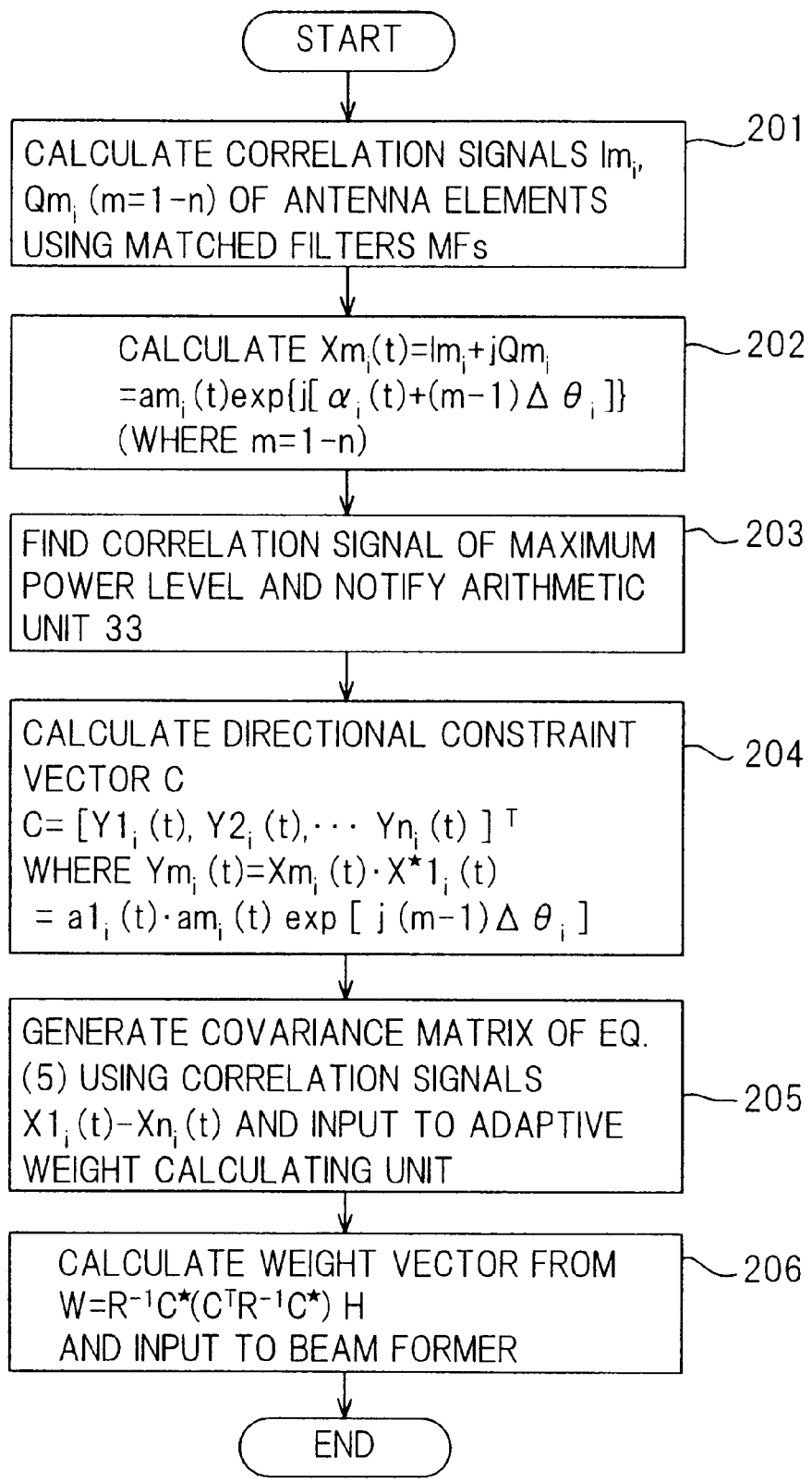
FIG. 9 is a flowchart of processing (phase and amplitude control) for obtaining in-phase antenna output signals.

FIG. 9 is a flowchart of processing for adaptive control by DCMP.

The matched filters $31_1-31_n$ calculate correlation signals $Im_i$, $Qm_i$ (m=1–n) from the output signals of the antenna elements $1_1-1_n$ received from an ith user (step 201). Next, the correlation signals of Equations (1) are obtained (step 202). The path selector 32 finds the correlation signal of largest power and notifies the arithmetic unit 33 (step 203). It will be assumed that the correlation signal of the first antenna has the largest power. Further, the path selector 32 instructs the arithmetic unit 33 of calculation start timing in dependence upon the delay time of each path of the multipaths.

In response to the calculation start indication, the arithmetic unit 33 calculates the directional constraint vector C in accordance with Equations (2) and (6) at the timing of the initial path of the multipaths (step 204). The arithmetic unit 33 further generates the covariance matrix R in accordance with Equation (7) using the correlation signals $X1_i(t), X2_i(t), \ldots, Xn_i(t)$ of the respective antenna elements and inputs the directional constraint vector C and the covariance matrix R to the adaptive weight calculating unit 4 (step 205).

The adaptive weight calculating unit 4 calculates the adaptive weights for the respective antenna elements in accordance with Equation (8) (step 206).

The searcher 3 and adaptive weight calculating unit 4 subsequently repeat the above-described processing at a timing conforming to each path of the multipaths.

By virtue of the above-described operation, the phases of the correlation signals of the respective antenna elements can be made the same as that of the correlation signal of the antenna for which the reception power is maximum. Moreover, the power of received interference is made small.

(f) Averaging

Figure 10:
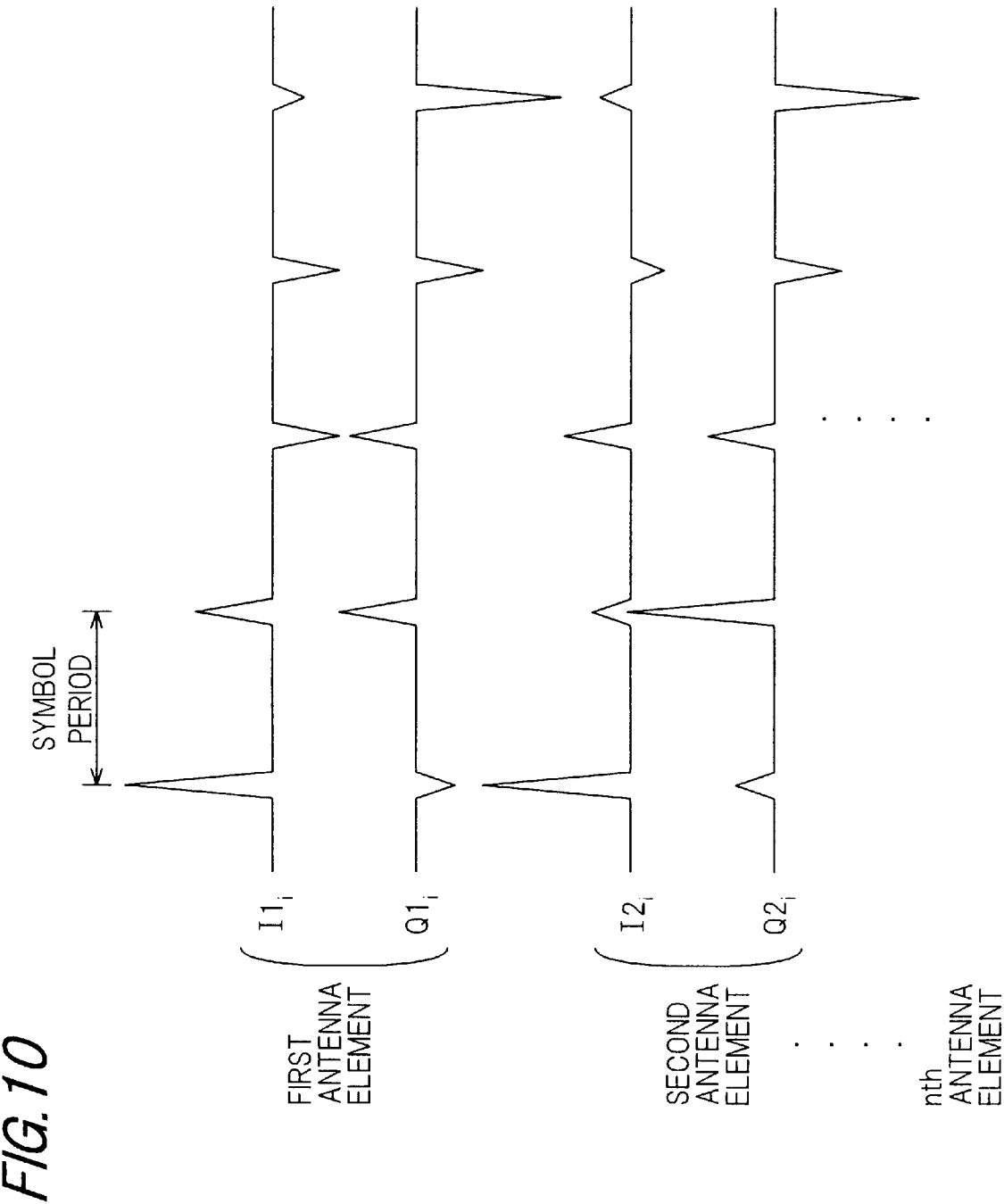
FIG. 10 is a diagram showing an example of correlation signals.

In a case where the period of a spreading code is one symbol interval, a correlation peak is observed every symbol of the data, as shown in FIG. 10. A problem arises in terms of accuracy when the above-described calculation is performed with the correlation signal of only one symbol. Accordingly, in adaptive control for obtaining antenna output signals of the same phase, as described in section (c) above, the arithmetic unit 33 of the searcher 3 performs the calculation of Equation (4) for an arbitrary number of symbols, obtains the average value and inputs the average value to the adaptive weight calculating unit 4. Alternatively, the average value of correlation signals of an arbitrary number of symbols is obtained, the calculation of Equation (4) is performed using this average value and the result of calculation is input to the adaptive weight calculating unit 4.

In adaptive control, with accompanying amplitude control, for obtaining antenna output signals of the same phase, as described in section (e) above, the searcher performs the operations of Equations (6) and (7) for an arbitrary number of symbols, obtains the average value and inputs the average value to the adaptive weight calculating unit 4.

Calculation accuracy can be improved by performing averaging in the manner described above.

(g) Phase difference

If the phase difference $\Delta\theta_i$ between received signals from two adjacent antenna elements is obtained in adaptive control for obtaining in-phase antenna output signals, the adaptive weights become as follows:

$$\exp[j(-\Delta\theta_i)], \exp[j(-2\Delta\theta_i)], \ldots, \exp[j(-(n-1)\Delta\theta_i)]$$

Accordingly, if the phase difference $\Delta\theta_i$ can be obtained with high accuracy, the accuracy of the adaptive weights can be raised and so can the accuracy of control.

In general, the phase of a correlation signal having a high level is highly reliable whereas the phase of a correlation signal having a low level is low in reliability.

Accordingly, correlation signals, from among the correlation signals $X1_i(t), X2_i(t), \ldots, Xn_i(t)$ obtained from the output signals of the antennas $1_1-1_n$, are formed into sets of two correlation signals each in order of descending reception level, and the operation of Equation (2) is performed using the two correlation signals in each of the sets, whereby the phase differences between the two signals in each of the sets are obtained. The phase differences thus obtained are then averaged upon weighting them taking into consideration the average values of the reception powers of the two corresponding antennas, whereby the phase difference $\Delta\theta_i$ between correlation signals of mutually adjacent antenna elements is calculated. Adaptive weights are then calculated using this phase difference.

Figure 11:
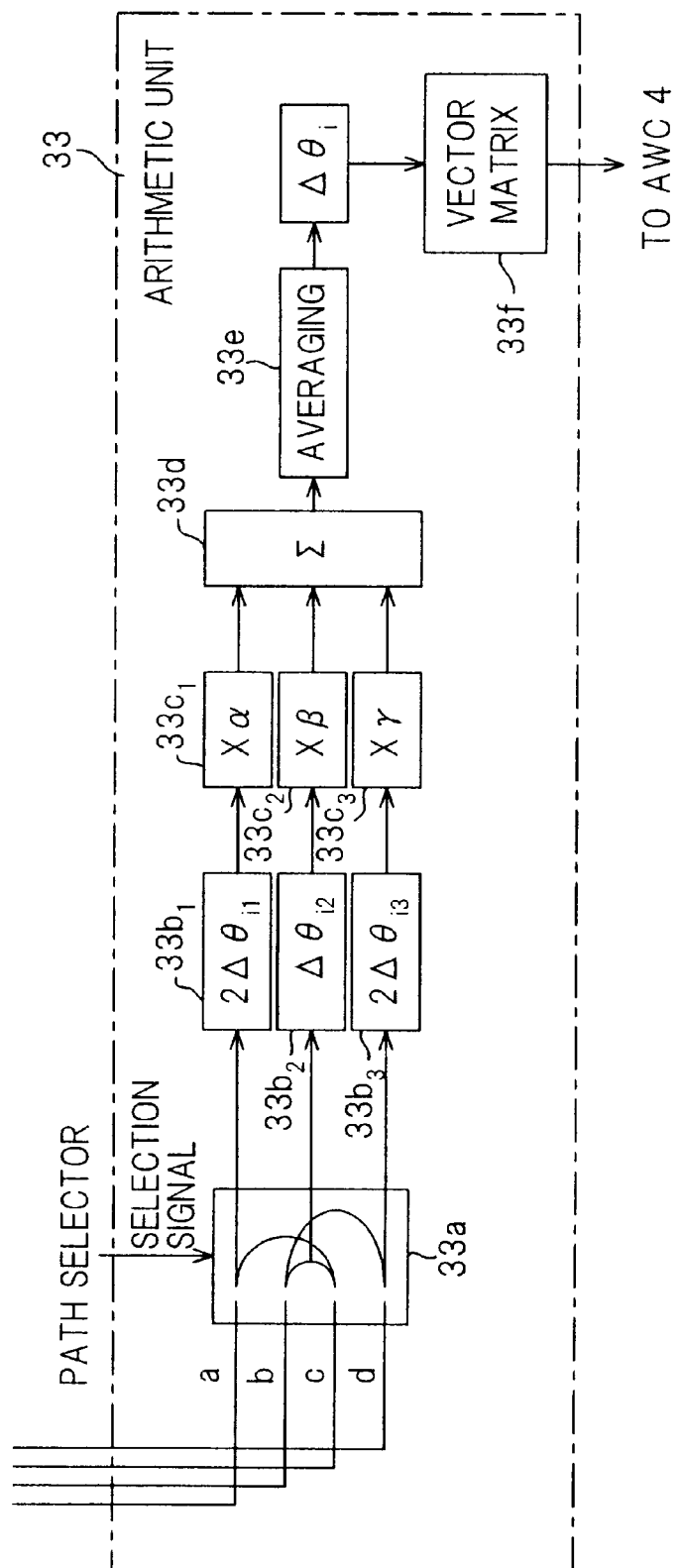
FIG. 11 is a flowchart of processing for calculating $\Delta\theta_i$.

FIG. 11 illustrates the flow of processing executed by the arithmetic unit 33 to calculate $\Delta\theta_i$. This is for a case where there are four antennas a, b, c and d. The antennas are equally spaced and arrayed in the order a, b, c, d. By way of example, assume that the levels of the correlation signals of the antenna signals received from an ith user via any path have the order a>c>b>d. On the basis of the selection signal from the path selector 32, a selecting unit 33a divides the correlation signals into sets of two correlation signals each in order of descending reception level, i.e., sets a, c; c, b; and b, d. Next, arithmetic units $33b_1-33b_3$ perform the operation of Equation (2) to obtain the phase difference $2\Delta\theta_{i1}$ between the signals a and c, the phase difference $\Delta\theta_{i2}$ between the signals c and b and the phase difference $2\Delta\theta_{i3}$ between the signals b and d. Multipliers $33c_1-33c_3$ then obtain weights $\alpha, \beta, \gamma$ ($\alpha>\beta>\gamma$), which are proportional to the average values of the powers received by the two antennas of the respective sets, and multiply the phase differences $2\Delta\theta_{i1}, \Delta\theta_{i2}, 2\Delta\theta_{i3}$ by the weights $\alpha, \beta, \gamma$, respectively. An adder 33d adds the outputs of the multipliers $33c_1-33c_3$ and an arithmetic unit 33e performs averaging in accordance with the following equation:

$$\Delta\theta_i=(2\Delta\theta_{i1}\cdot\alpha+\Delta\theta_{i2}\cdot\beta+2\Delta\theta_{i3}\cdot\gamma)/(2\alpha+\beta+2\gamma) \qquad (9)$$

This makes it possible to obtain a highly precise $\Delta\theta_i$. Finally, a vector/matrix arithmetic unit 33f calculates the vector and matrix for calculation of the adaptive weights.

(h) Beam forming

Figure 12A:
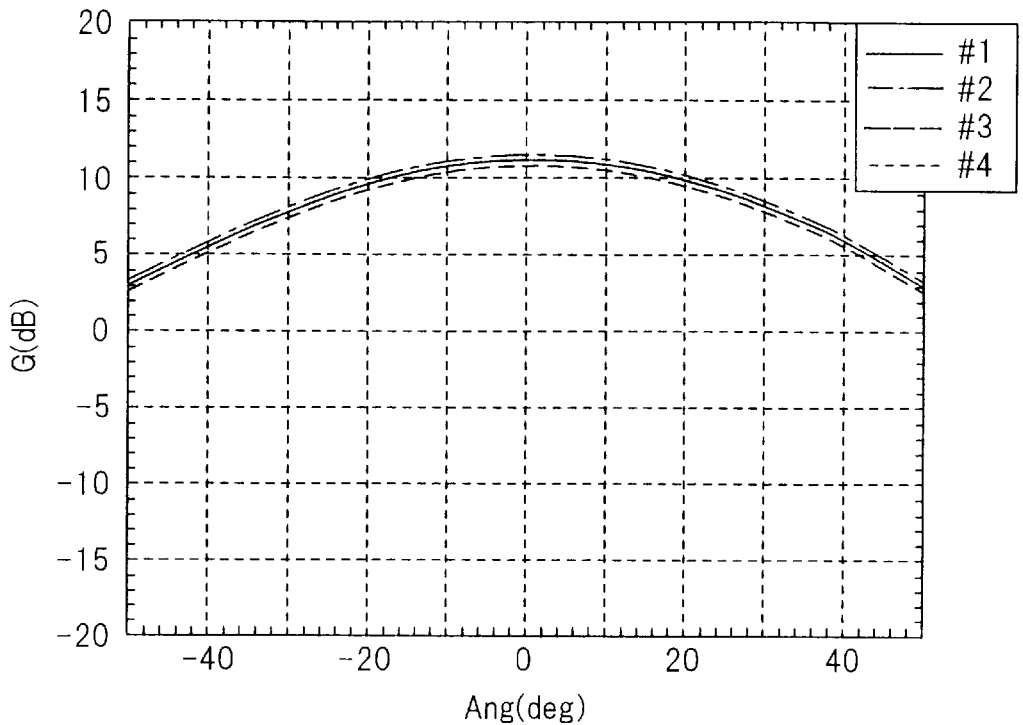
FIGS. 12A, 12B are diagrams useful in describing beam directivity in the sector of an array antenna.
Figure 12B:
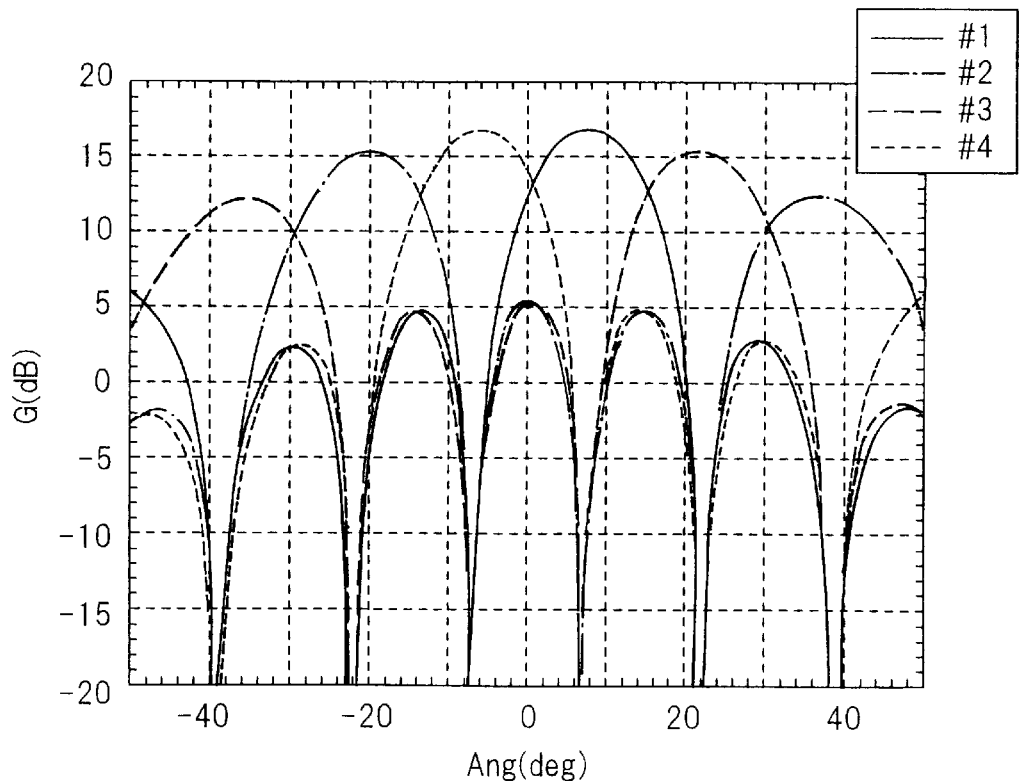

In general, a sector antenna directed to a particular sector is used as each of the antennas in an adaptive array antenna system. However, since a sector antenna has a large beam width, as shown in FIG. 12A, it becomes susceptible to interference from other channels when traffic increases. The result is a decline in communication quality. When there is an increase is traffic, therefore, the beam is narrowed, as illustrated in FIG. 12B. As a result, synchronous point extraction is performed by the matched filters (MF) using signals in a state in which interference in the sector is reduced.

Figure 13A:
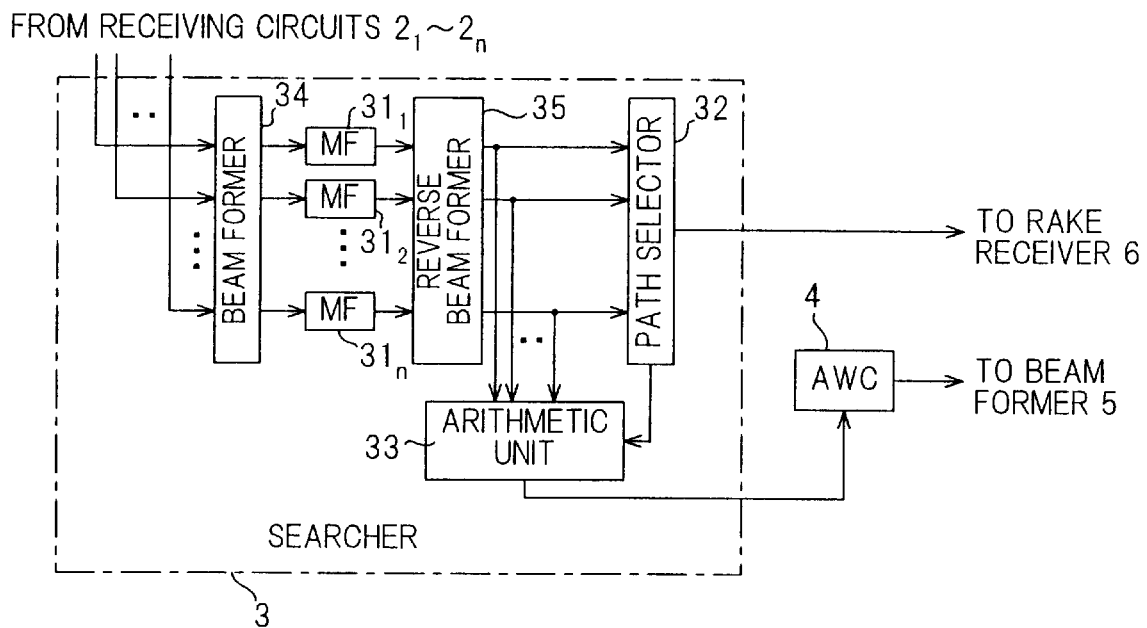
FIGS. 13A, 13B are diagrams showing the construction of a searcher having a beam former and a reverse beam former.

FIG. 13A is a diagram showing the construction of a searcher having a beam former and a reverse beam former. Components identical with those of the searcher shown in FIG. 3 are designated by like reference characters. In FIG. 13A, a beam former 34 for narrowing the beam is provided in front of matched filters $31_1-31_n$. The beam former 34 forms beams electrically and outputs the beams from respective terminals, whereby four antennas #1–#4 are provided with the beam directivity patterns illustrated in FIG. 12B. A reverse beam former 35, which is provided in back of the matched filters $31_1-31_n$, performs an arithmetic operation for converting correlation signals of respective beams back to the original ones received by the antennas. By thus providing the beam former as well as the reverse beam former, beams are shaped and interference reduced by beam forming, the signals obtained are subjected to a correlation operation to perform synchronous point extraction, and the original correlation signals are restored by reverse beam forming. If this arrangement is adopted, a greater degree of allowance can be provided for traffic.

Figure 13B:
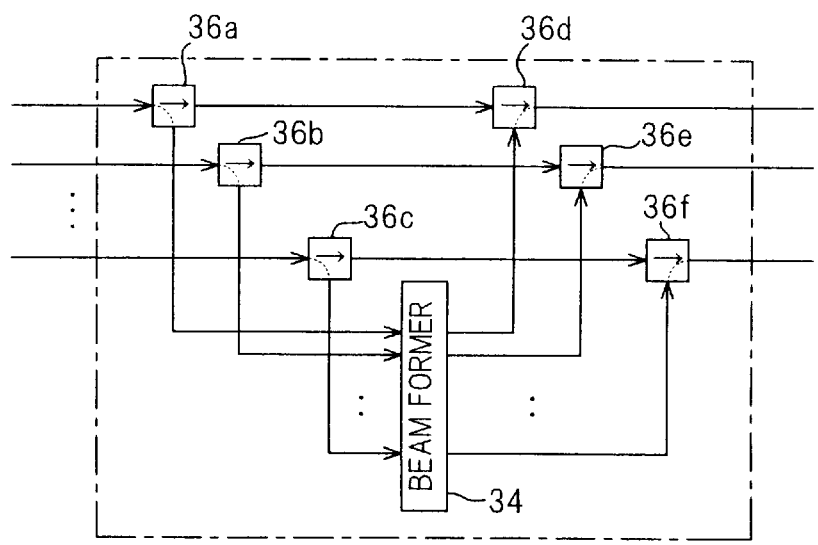

As shown in FIG. 13B, signals are controlled by switches 36a–36f in dependence upon traffic conditions in such a manner that the signals are caused to bypass (the solid-line arrows) the beam former 34 or pass through (the phantom lines) the beam former 34. Though not shown, the reverse beam former 35 has a switching arrangement similar to that of the beam former 34.

Figure 14:
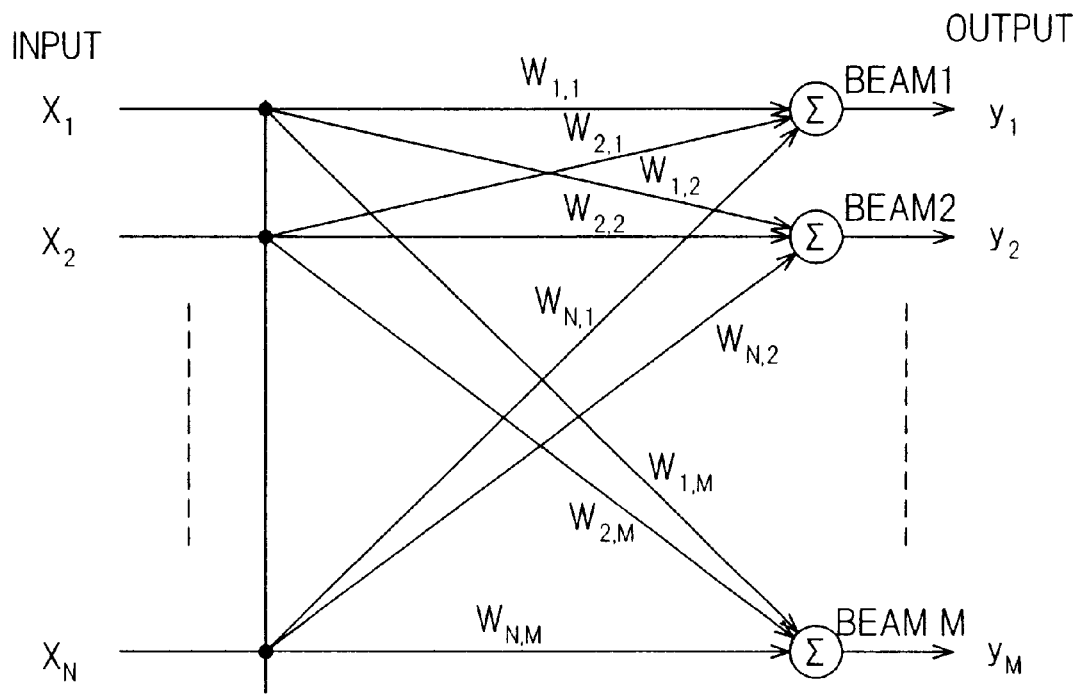
FIG. 14 is a diagram showing the configuration of a beam former.

FIG. 14 shows an example of a beam former. The beam former multiplies output signals $x_1-x_n$ of the respective antenna elements by weights $W_{k,i}$ to thereby implement phase rotation, and sums the products to electrically form M-number of uplink reception beams 1–M each having a prescribed directivity. If $x_1-X_N$ represent the reception signals of N-number of antenna elements and $W_{k,i}$ represents the conversion coefficient of the beam former, then a signal $y_i$ of an ith beam (i=1–M) will be expressed by the following:

$y_i = \Sigma W_{k,i} \cdot x_k \ (k=1-N)$

Figure 15:
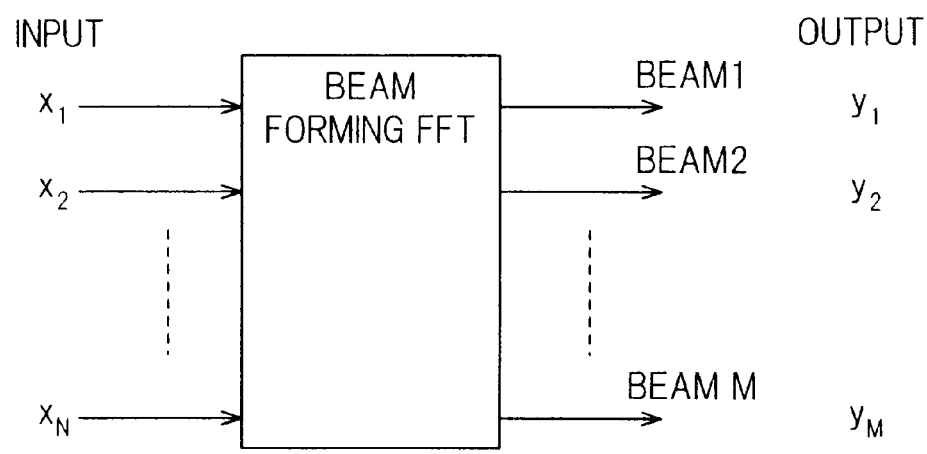
FIG. 15 is a diagram showing a beam former using an FFT.

The directivity of the sector array antenna can be narrowed by deciding the conversion coefficient $W_{k,i}$. This makes it possible to reduce interference. FIG. 15 shows an example of a beam former which performs the beam forming operation using an FFT.

In accordance with the present invention, a feed-forward adaptive algorithm is applied using correlation signals from a searcher, and signals prior to despreading are multiplied, on per-user and per-path basis, by weights that have been obtained. This makes it possible to utilize the majority of the components of the standard DS-CDMA receiver so that the AAA system can be constructed with little modification. This contributes greatly to the implementation of a low-cost base station of superior performance.

In accordance with the array antenna system of the present invention, it is unnecessary to use the result of discrimination of received data. Adaptive weights are capable of being decided and input to a Rake receiver in feed-forward fashion, thus making it possible to construct an AAA system without modifying the Rake receiver in any way. As a result, a conventional Rake receiver can be used as is and the transition to use of an AAA system in a base station is facilitated.

In accordance with the present invention, means for calculating adaptive weights decides adaptive weights in such a manner that the phases of correlation signals of all antenna elements are made the same as the phase of the correlation signal of a prescribed antenna element. This makes it possible to point a beam adaptively in the direction of the angle of arrival. As a result, it is possible to raise the gain and reduce interference in the area, increase the number of users that can be accommodated by one cell and/or improve communication quality. In this case, the phases are made the same as that of the correlation signal for which the power level is highest. As a result, the phases will agree with the antenna whose signal is strongest, i.e., for which the reliability is highest. This makes it possible to raise the accuracy of beam control in the AAA system.

In accordance with the present invention, the means for calculating the adaptive weights calculates an adaptive weight for each antenna element using a directional constraint vector C and a covariance matrix R. This makes it possible to make the phases of all correlation signals the same and to reduce the power of received interference waves.

In accordance with the present invention, control precision by an AAA system can be improved by calculating adaptive weights using an average value of correlation signals per prescribed time.

The present invention is such that from among the correlation signals obtained from the output signals of respective antenna elements, sets of two correlation signals each are formed in order of descending reception level and a phase difference between the correlation signals in each set is averaged upon applying weighting conforming to the reception level, thereby calculating the phase difference between correlation signals of neighboring antenna elements. Adaptive weights are calculated using the phase difference calculated. This makes it possible to raise the control accuracy of the AAA system.

In accordance with the present invention, beam forming is applied before the correlation signal of each antenna element is calculated, thereby narrowing the beam. As a result, interference is reduced. By applying processing that is the opposite of beam forming to an obtained correlation signal to thereby restore the original correlation signal received by the antenna, the control precision of the AAA system can be improved even if traffic increases.

As many apparently widely different embodiments of the present invention can be made without departing from the spirit and scope thereof, it is to be understood that the invention is not limited to the specific embodiments thereof except as defined in the appended claims.

What is claimed is:

1. An array antenna system of a wireless base station in CDMA mobile communications for combining signals, which have been received by a plurality of antenna elements of an array antenna, upon subjecting the signals to prescribed amplitude weights and phase rotation, and despreading the combined signal, comprising:

means for applying a correlation operation to an output signal from each antenna element to thereby calculate correlation signals corresponding to each antenna element that is correlated with a signal transmitted from a mobile station of interest;

means for calculating adaptive weights corresponding to each antenna element from the correlation signals;

means for multiplying, by the adaptive weights calculated for the respective antenna elements, output signals from the corresponding antenna elements and combining the resulting products to output a combined signal; and demodulation means for despreading the combined signal.

2. An array antenna system of a wireless base station in CDMA mobile communications for combining signals, which have been received by a plurality of antenna elements of an array antenna, upon subjecting the signals to prescribed amplitude weights and phase rotation, and despreading the combined signal, comprising:

correlation signal calculating means for applying a correlation operation to an output signal from each antenna element to thereby calculate correlation signals corresponding to each antenna element that is correlated with a signal transmitted from a mobile station of interest, this being carried out for each path of multipaths from the mobile station of interest to the array antenna;

adaptive weight calculating means for calculating adaptive weights corresponding to each antenna element from the correlation signals, this being carried out for each path of multipaths from the mobile station of interest to the array antenna;

combining means provided for each path of multipaths from the mobile station to the antenna array for multiplying, by the adaptive weights calculated for every path and for the respective antenna elements, output signals from the corresponding antenna elements and combining the resulting products; and a Rake receiver having despreading means for despreading signal output by respective ones of the combining means and a combining unit for combining signals output by each of the despreading means upon applying a delay time adjustment thereto.

3. An array antenna system of a wireless base station in CDMA mobile communications for combining signals, which have been received by a plurality of antenna elements of an array antenna, upon subjecting the signals to prescribed amplitude weights and phase rotation, and despreading the combined signal, comprising:

correlation signal calculating means for applying a correlation operation to an output signal from each antenna element to thereby calculate correlation signals corresponding to each antenna element that is correlated with a signal transmitted from a mobile station of interest, this being carried out for each path of multipaths from the mobile station of interest to the array antenna;

adaptive weight calculating means for calculating adaptive weights corresponding to each antenna element from the correlation signals, this being carried out for each path of multipaths from the mobile station of interest to the array antenna;

combining means provided for each path of multipaths from the mobile station to the antenna array for multiplying, by the adaptive weights calculated for every path and for the respective antenna elements, output signals from the corresponding antenna elements and combining the resulting products;

a Rake receiver having despreading means for despreading signal output by respective ones of the combining means and a combining unit for combining signals output by each of the despreading means upon applying a delay time adjustment thereto, a demodulator for quadrature-demodulating the output signal from the respective antenna element to thereby output in-phase and quadrature-phase component signals;

wherein said correlation signal calculating means applies a correlation operation to each of the in-phase and quadrature-phase component signals and outputs said correlation signals, which have amplitude and phase characteristics, using in-phase and quadrature-phase component signals obtained by the correlation operation; and said adaptive weight calculating means multiplies a signal, which is obtained by inverting the phase of a correlation signal of an mth antenna element, by the correlation signals of all antenna elements, and outputs signals, which are obtained by inverting the phases of the resulting products, as adaptive weights for respective ones of the antenna elements, thereby making the phases of all correlation signals the same as the phase of the correlation signal of the mth antenna element.

4. The system according to claim 3, wherein said adaptive weight calculating means adopts an antenna element corresponding to a correlation signal having the highest power level as said mth antenna element.

5. The system according to claim 3, wherein said adaptive weight calculating means obtains an average value, per prescribed time, of the correlation signal of said in-phase and quadrature-phase components and calculates adaptive weights using this average value.

6. An array antenna system of a wireless base station in CDMA mobile communications for combining signals, which have been received by a plurality of antenna elements of an array antenna, upon subjecting the signals to prescribed amplitude weights and phase rotation, and despreading the combined signal, comprising:

correlation signal calculating means for applying a correlation operation to an output signal from each antenna element to thereby calculate correlation signals corresponding to each antenna element that is correlated with a signal transmitted from a mobile station of interest, this being carried out for each path of multipaths from the mobile station of interest to the array antenna;

adaptive weight calculating means for calculating adaptive weights corresponding to each antenna element from the correlation signals, this being carried out for each path of multipaths from the mobile station of interest to the array antenna;

combining means provided for each path of multipaths from the mobile station to the antenna array for multiplying, by the adaptive weights calculated for every path and for the respective antenna elements, output signals from the corresponding antenna elements and combining the resulting products;

a Rake receiver having despreading means for despreading signal output by respective ones of the combining means and a combining unit for combining signals output by each of the despreading means upon applying a delay time adjustment thereto, a demodulator for quadrature-demodulating the output signal from the respective antenna element to thereby output in-phase and quadrature-phase component signals;

wherein said correlation signal calculating means applies a correlation operation to each of the in-phase and quadrature-phase component signals and outputs said correlation signals, which have amplitude and phase characteristics, using in-phase and quadrature-phase components signals obtained by the correlation operation;

said adaptive weight calculating means multiplies a signal, which is obtained by inverting the phase of a correlation signal of an mth antenna element, by the correlation signals of all antenna elements, decides a directional constraint vector C using the resulting products, generates a covariance matrix R using the correlation signals of the respective antenna elements, calculates an adaptive weight for each antenna element using the directional constraint vector C and the covariance matrix R and outputs the adaptive weights, thereby making the phases of all correlation signals the same as the phase of the correlation signal of the mth antenna element and reducing power of received interference waves.

7. The system according to claim 6, wherein said adaptive weight calculating means adopts an antenna element corresponding to a correlation signal having the highest power level as said mth antenna element.

8. The system according to claim 6, wherein said adaptive weight calculating means obtains an average value, per prescribed time, of the correlation signal of said in-phase and quadrature-phase components and calculates adaptive weights using this average value.

9. The system according to claim 2, wherein said adaptive weight calculating means forms, from among the correlation signals obtained from the output signals of respective antenna elements, sets of two correlation signals each in order of descending reception level, and averages a phase difference between the correlation signals in each set upon applying weighting conforming to the reception level, thereby calculating the phase difference between correlation signals of neighboring antenna elements, and calculates adaptive weights using the phase differences.

10. The system according to claim 2, further comprising:

a beam former, which is provided between the array antenna and said correlation signal calculating means, for performing beam forming; and a reverse beam former, which is provided between said correlation signal calculating means and said adaptive weight calculating means, for performing an operation that is the reverse of beam forming.

11. The system according to claim 10, further comprising a selector for selecting, in dependence upon traffic, a path along which beam forming is performed and a path along which no beam forming is performed.

* * * * *